US011976965B2

(12) United States Patent
Chiu et al.

(10) Patent No.: US 11,976,965 B2
(45) Date of Patent: May 7, 2024

(54) OPTICAL DETECTOR MODULE AND A METHOD FOR OPERATING THE SAME

(71) Applicant: Artilux, Inc., Menlo Park, CA (US)

(72) Inventors: Kai-Wei Chiu, Hsinchu County (TW); Chih-Wei Chen, Hsinchu County (TW); Chih-Wei Yeh, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 104 days.

(21) Appl. No.: 17/730,934

(22) Filed: Apr. 27, 2022

(65) Prior Publication Data

US 2022/0349746 A1    Nov. 3, 2022

Related U.S. Application Data

(60) Provisional application No. 63/270,018, filed on Oct. 20, 2021, provisional application No. 63/183,064, filed on May 3, 2021.

(51) Int. Cl.
  *G01J 1/02*    (2006.01)
(52) U.S. Cl.
  CPC ............ *G01J 1/029* (2013.01); *G01J 1/0204* (2013.01); *G01J 1/0219* (2013.01); *G01J 1/0228* (2013.01)
(58) Field of Classification Search
  CPC ........ G01J 1/029; G01J 1/0204; G01J 1/0219; G01J 1/0228; G01J 1/4204; G01J 1/16; G01S 7/486; G01S 17/02; G01S 7/48; A61B 5/0064
  See application file for complete search history.

(56) References Cited

U.S. PATENT DOCUMENTS

| 8,077,304 | B2 * | 12/2011 | Chiba ................... G01J 1/0271 356/213 |
| 2016/0286631 | A1 * | 9/2016 | Wan ....................... G08C 17/02 |
| 2017/0328766 | A1 * | 11/2017 | Gong .................... G01J 3/0264 |
| 2021/0092822 | A1 * | 3/2021 | Gurjar ................... G01J 1/0219 |
| 2021/0123801 | A1 * | 4/2021 | Liu ..................... A61B 5/14551 |
| 2022/0014189 | A1 * | 1/2022 | Haines .................. G01J 1/4204 |
| 2022/0167481 | A1 * | 5/2022 | Shin ..................... H05B 47/175 |
| 2022/0326073 | A1 * | 10/2022 | Barel .................... G06F 1/1684 |

\* cited by examiner

*Primary Examiner* — David P Porta
*Assistant Examiner* — Gisselle M Gutierrez
(74) *Attorney, Agent, or Firm* — Dority & Manning, P.A.

(57) ABSTRACT

An optical detector module can be used to implement proximity sensing function by detecting ambient light outside of the optical detector module in accordance with a first detection threshold. An optical detector module can be further used to implement other active functions such as material detection (e.g., skin) or depth-sensing by emitting one or more optical signals (e.g., light pulses at a specific wavelength) and detecting the reflected optical signals relative to a second and/or third detection threshold. The disclosure provides technical solutions for actively monitoring detection threshold(s) of an optical detector module to achieve better power management. In some embodiments, such solutions are useful for photodetectors having a wide sensing bandwidth, such as a photodetector formed in germanium or a photodetector comprising an absorption region comprising germanium.

20 Claims, 23 Drawing Sheets

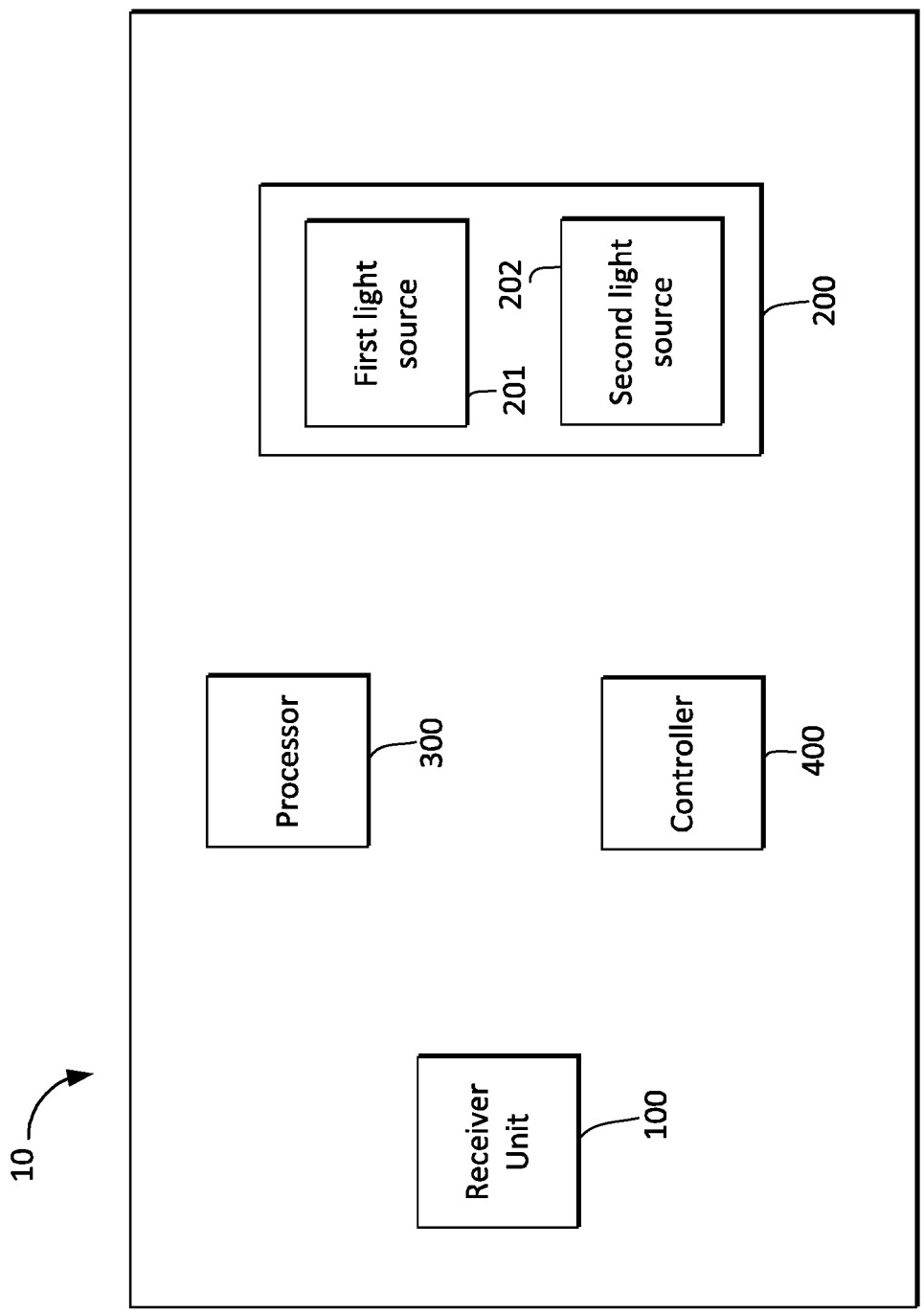

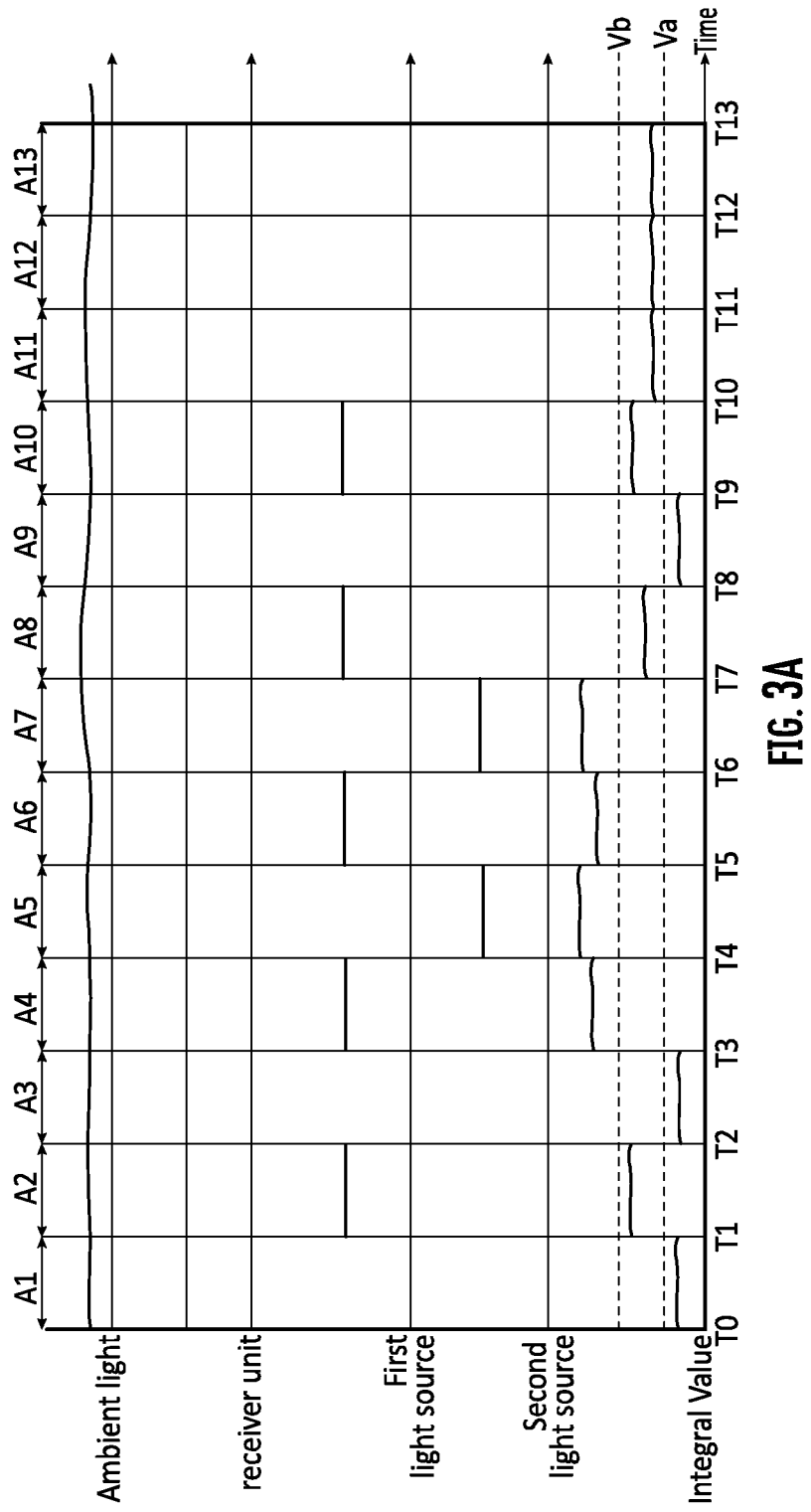

OPTICAL DETECTOR MODULE AND A METHOD FOR OPERATING THE SAME

RELATED APPLICATIONS

The present application claims filing benefit of U.S. Provisional Patent Application Ser. No. 63/183,064, having a filing date of May 3, 2021, and U.S. Provisional Patent Application Ser. No. 63/270,018, having a filing date of Oct. 20, 2021. All such applications are incorporated herein by reference in its entirety.

FIELD

The present disclosure relates generally to an optical detector module and a method for operating the same.

BACKGROUND

Sensors are being used in many applications, such as smartphones, wearables, robotics, and autonomous vehicles, etc. for object recognition, image enhancement, material recognition, and other relevant applications.

SUMMARY

Aspects and advantages of embodiments of the present disclosure will be set forth in part in the following description, or may be learned from the description, or may be learned through practice of the embodiments.

One example aspect of the present disclosure is directed to a method for operating an optical detector module. The method includes (i) detecting, by a receiver unit of the optical detector module, an ambient light. The method also includes (ii) acquiring, by a processor, a first integral value from the receiver unit corresponding to the ambient light. The method also includes (iii) determining, by the processor, whether the first integral value satisfies a first threshold condition. The method also includes (iv) in response to determining that the first integral value does not satisfy the first threshold condition, sending, by a controller, one or more first control signals to (1) disable a first light source of the transmitter unit of the optical detector module configured to emit a first optical signal with a first peak wavelength and disable a second light source of the transmitter unit of the optical detector module configured to emit a second optical signal with a second peak wavelength, or (2) lower a detecting frequency of the receiver unit. The method also includes (v) in response to determining that the first integral value satisfies the first threshold condition, sending, by the controller, one or more second control signals to enable the first light source of the transmitter unit of the optical detector module to emit the first optical signal with the first peak wavelength.

In some implementations, v) further includes (a) acquiring, by the processor, a second integral value from the receiver unit corresponding to the first optical signal. In addition, (v) includes (b) determining, by the processor, whether the second integral value satisfies a second threshold condition. In addition, (v) includes (c) in response to determining that the second integral value satisfies the second threshold condition, sending, by the controller, one or more third control signals to enable the second light source of the transmitter unit of the optical detector module to emit the second optical signal with the second peak wavelength, wherein the first peak wavelength is different from the second peak wavelength. In addition, (v) includes (d) in response to determining that the second integral value does not satisfy the second threshold condition, sending, by the controller, one or more fourth control signals to (1) disable the second light source or (2) lower the detecting frequency of the receiver unit.

In some implementations, lowering the detecting frequency of the receiver unit further comprises (1) lowering a frequency of the first optical signal emitted by the first light source or lowering a frequency of the second optical signal emitted by the second light source; or (2) lowering an operating frequency of the receiver unit.

In some implementations, (a) further includes obtaining, by the processor and from the receiver unit, a first background integral value corresponding to ambient light within a first reference time slot before a first target time slot. In addition, (a) further includes obtaining, by the processor and from the receiver unit, a first foreground integral value corresponding to a combination of ambient light and the first optical signal within the first target time slot. In addition, (a) further includes obtaining, by the processor and from the receiver unit, a second background integral value corresponding to ambient light within a second reference time slot after the first target time slot. In addition, (a) further includes determining, by the processor, an average of the first background integral value and the second background integral value to obtain an averaged background integral value. In addition, (a) further includes adjusting, by the processor and based on the averaged background integral value, the first foreground integral value to determine the second integral value.

In some implementations, (a) further includes obtaining, by the processor and from the receiver unit, a first group of background integral values corresponding to ambient light within multiple first reference time slots before a first target time slot. In addition, (a) further includes obtaining, by the processor and from the receiver unit, a first foreground integral value corresponding to a combination of ambient light and the first optical signal within the first target time slot. In addition, (a) further includes obtaining, by the processor and from the receiver unit, a second group of background integral values corresponding to ambient light within multiple second reference time slots after the first target time slot. In addition, (a) further includes determining, by the processor, an average of the first group of background integral values and the second group of background integral values to obtain an averaged background integral value. In addition, (a) further includes adjusting, by the processor and based on the averaged background integral value, the first foreground integral value to determine the second integral value.

In some implementations, (c) further includes detecting, by the receiver unit of the optical detector module, the second optical signal with the second peak wavelength. In addition, (c) further includes acquiring, by the processor, a third integral value corresponding to the second optical signal. In addition, (c) further includes determining, by the processor, a comparison of the second integral value and the third integral value. In addition, (c) further includes identifying, by the processor and based on the comparison, a material of a target.

In some implementations, acquiring the third integral value further includes obtaining, by the processor and from the receiver unit, a third background integral value corresponding to ambient light within a third reference time slot before a second target time slot. Acquiring the third integral value further includes obtaining, by the processor and from the receiver unit, a second foreground integral value corresponding to a combination of ambient light and the second optical signal within the second target time slot. Acquiring the third integral value further includes obtaining, by the processor and from the receiver unit, a fourth background integral value corresponding to ambient light within a fourth reference time slot after the second target time slot. Acquiring the third integral value further includes determining, by the processor, an average of the third background integral value and the fourth background integral value to obtain an averaged background integral value. Acquiring the third integral value further includes adjusting, by the processor and based on the averaged background integral value, the second foreground integral value to determine the third integral value.

In some implementations, acquiring the second integral value further includes obtaining, by the processor and from the receiver unit, a first background integral value corresponding to ambient light within a first reference time slot before a first target time slot. Acquiring the second integral value further includes obtaining, by the processor and from the receiver unit, a first foreground integral value corresponding to a combination of ambient light and the first optical signal within the first target time slot. Acquiring the second integral value further includes obtaining, by the processor and from the receiver unit, a second background integral value corresponding to ambient light within a second reference time slot after the first target time slot. Acquiring the second integral value further includes determining, by the processor, an average of the first background integral value and the second background integral value to obtain an averaged background integral value. Acquiring the second integral value further includes adjusting, by the processor and based on the averaged background integral value, the first foreground integral value to determine the second integral value.

In some implementations, acquiring the third integral value further includes obtaining, by the processor and from the receiver unit, a third group of background integral values corresponding to ambient light within multiple third reference time slots before a second target time slot. Acquiring the third integral value further includes obtaining, by the processor and from the receiver unit, a second foreground integral value corresponding to a combination of ambient light and the second optical signal within the second target time slot. Acquiring the third integral value further includes obtaining, by the processor and from the receiver unit, a fourth group of background integral values corresponding to ambient light within multiple fourth reference time slots after the second target time slot. Acquiring the third integral value further includes determining, by the processor, an average of the third group of background integral values and the fourth group of background integral values to obtain an averaged background integral value. Acquiring the third integral value further includes adjusting, by the processor and based on the averaged background integral value, the second foreground integral value to determine the second integral value.

In some implementations, acquiring the second integral value further includes obtaining, by the processor and from the receiver unit, a first group of background integral values corresponding to ambient light within multiple first reference time slots before a first target time slot. Acquiring the second integral value further includes obtaining, by the processor and from the receiver unit, a first foreground integral value corresponding to a combination of ambient light and the first optical signal within the first target time slot. Acquiring the second integral value further includes obtaining, by the processor and from the receiver unit, a second group of background integral values corresponding to ambient light within multiple second reference time slots after the first target time slot. Acquiring the second integral value further includes determining, by the processor, an average of the first group of background integral values and the second group of background integral values to obtain an averaged background integral value. Acquiring the second integral value further includes adjusting, by the processor and based on the averaged background integral value, the first foreground integral value to determine the second integral value.

In some implementations, the material comprises human skin, wood or fabric.

In some implementations, the method also includes determining, by the processor, whether the material of the target is skin. In response to determining that the material of the target is not skin, the method includes repeating steps (i), (ii), (iii), (iv) and (v).

In some implementations, the method also includes determining, by the processor, whether the material of the target is skin. In response to determining that the material of the target is skin, the method includes implementing a health sensing function comprising at least one of determining a heartrate, determining a temperature, or determining an oxygen saturation level.

In some implementations, the method also includes determining, by the processor, whether the material of the target is skin. In response to determining that the material of the target is skin, the method includes implementing a biometric authentication operation.

In some implementations, the method also includes determining, by the processor, whether the material of the target is skin. In response to determining that the material of the target is skin, the method includes adjusting one or more operating parameters of the optical detector module to reduce power expended by the optical detector module.

Another example aspect of the present disclosure is directed to an optical detector module that includes a receiver unit, a transmitter unit comprising a first light source configured to emit first optical signal with first peak wavelength and a second light source configured to emit second light with second peak wavelength, a processor in electrical communication with the receiver unit, and a controller in electrical communication with the receiver unit, the processor and/or the transmitter unit. The optical detector module is configured to perform operations. The operations include detecting, by the receiver unit of the optical detector module, an ambient light. The operations also include acquiring, by the processor, a first integral value from the receiver unit corresponding to the ambient light. The operations also include determining, by the processor, whether the first integral value satisfies a first threshold condition. The operations also include in response to determining that the first integral value does not satisfy the first threshold condition, sending, by a controller, one or more first control signals to (1) disable a first light source of the transmitter unit of the optical detector module and disable a second light source of the transmitter unit of the optical detector module, or (2) lower a detecting frequency of the receiver unit. The operations also include in response to determining that the first integral value satisfies the first threshold condition, sending, by the controller, one or more second control signals to enable the first light source of the transmitter unit of the optical detector module to emit the first optical signal with the first peak wavelength.

In some implementations, the optical detector module is configured for use in a wireless earbud.

In some implementations, the optical detector module is configured for use in a wearable computing device.

Another example aspect of the present disclosure is related to a method for operating an optical detector module. The method includes (i) obtaining, by a processor and from a receiver unit of the optical detector module, a first background integral value corresponding to ambient light within a first reference time slot before a first target time slot. The method also includes (ii) obtaining, by the processor and from the receiver unit, a first foreground integral value corresponding to a combination of ambient light and target optical signal within the first target time slot. The method also includes (iii) obtaining, by the processor and from the receiver unit, a second background integral value corresponding to ambient light within a second reference time slot after the first target time slot. The method also includes (iv) determining, by the processor, an average of the first background integral value and the second background integral value to obtain an averaged background integral value. The method also includes (v) adjusting, by the processor and based on the averaged background integral value, the first foreground integral value to determine the second integral value.

Another example aspect of the present disclosure is related to a method for operating an optical detector module comprising multiple receiver units and multiple transmitter units corresponding to the multiple receiver units respectively. The method includes (i) detecting, by at least one of the receiver units of the optical detector module, an ambient light. The method also includes (ii) acquiring, by a processor, a first integral value from the receiver unit corresponding to the ambient light. The method also includes (iii) determining, by the processor, whether the first integral value satisfies a first threshold condition. The method also includes (iv) in response to determining that the first integral value does not satisfy the first threshold condition, sending, by a controller, one or more first control signals to (1) disable one or more light sources of the multiple transmitter units configured to emit an optical signal or (2) lower a detecting frequency of each of the receiver units. The method also includes (v) in response to determining that the first integral value satisfies the first threshold condition, sending, by the controller, one or more second control signals to enable one or more of the light sources of the multiple transmitter units of the optical detector module to emit the first optical signal with the first peak wavelength.

In some implementations, (v) further includes acquiring, by the processor, a second integral value from one of the receiver units corresponding to the first optical signal. In addition, (v) includes determining, by the processor, whether the second integral value satisfies a second threshold condition. In addition, (v) includes in response to determining that the second integral value satisfies the second threshold condition, sending, by the controller, one or more fourth control signals to (1) enable the one or more of the light sources of the multiple transmitter units. In addition, (v) also includes in response to determining that the second integral value does not satisfy the second threshold condition, sending, by the controller, one or more third control signals to disable at least one of the light sources or (2) lower the detecting frequency of the receiver unit corresponding to the at least one of the light sources.

Another example aspect of the present disclosure is directed to a pixelated wideband sensor pixelated wideband sensor. The pixelated wideband sensor includes a carrier and a pixel array supported by the carrier and comprising multiple pixels. Each pixel includes a first photodetector unit comprising a first photodetector configured to receive a first optical signal within a first wavelength range and to generate photo-carriers in response to the first optical signal. Each pixel also includes a second photodetector unit comprising a second photodetector configured to receive at least a second optical signal within a second wavelength range and to generate photo-carriers in response to the second optical signal, wherein the first wavelength range is outside a visible range and the second wavelength range is within the visible range. Each pixel also includes a light source array comprising multiple light sources surrounding the pixel array.

In some implementations of the pixelated wideband sensor, the multiple light sources include light-emitting diodes or vertical-cavity surface-emitting lasers.

In some implementations, the pixelated wideband sensor also includes an integrated circuit layer between the pixel array and the carrier, and the integrated circuit layer comprises a control circuit configured to control the pixel array.

In some implementations of the pixelated wideband sensor, the integrated circuit layer includes one or more drivers configured to control the light source array, and the integrated circuit layer is surrounded by and electrically coupled to the light source array.

In some implementations of the pixelated wideband sensor, the pixel array is a two-dimensional array.

In some implementations of the pixelated wideband sensor, the first photodetector includes a first absorption region composed of a first material comprising germanium, and the second photodetector includes RGB photodetectors composed of a second material comprising silicon.

In some implementations of the pixelated wideband sensor, the second photodetector includes at least one of the blue photodetector, green photodetector or the red photodetector.

In some implementations of the pixelated wideband sensor, at least one of the first photodetector unit or the second photodetector unit is at least partially embedded in a substrate.

Another example aspect of the present disclosure is directed to a pixelated wideband sensor assembly including multiple pixelated wideband sensors. Each of the pixelated wideband sensors includes a carrier and a pixel array supported by the carrier and comprising multiple pixels. Each pixel includes a first photodetector unit comprising a first photodetector configured to receive a first optical signal within a first wavelength range and to generate photo-carriers in response to the first optical signal. Each pixel also includes a second photodetector unit comprising a second photodetector configured to receive at least a second optical signal within a second wavelength range and to generate photo-carriers in response to the second optical signal. The first wavelength range is outside a visible range and the second wavelength range is within the visible range. Each pixel also includes a light source array comprising multiple light sources surrounding the pixel array.

In some implementations of the pixelated wideband sensor assembly, the pixelated wideband sensors are arranged in a two-dimensional array.

In some implementations of the pixelated wideband sensor assembly, the multiple light sources comprise light-emitting diodes or vertical-cavity surface-emitting lasers.

In some implementations, the pixelated wideband sensor assembly further includes an integrated circuit layer between the pixel array and the carrier, wherein the integrated circuit layer comprises a control circuit configured to control the pixel array.

In some implementations of the pixelated wideband sensor assembly, the integrated circuit layer includes one or more drivers configured to control the light source array, and the integrated circuit layer is surrounded by and electrically coupled to the light source array.

In some implementations of the pixelated wideband sensor assembly, the pixel array is a two-dimensional array.

In some implementations of the pixelated wideband sensor assembly, the first photodetector comprises a first absorption region comprising a first material comprising germanium, and the second photodetector comprises RGB photodetectors comprising a second material comprising silicon.

In some implementations of the pixelated wideband sensor assembly, the second photodetector includes at least one of the blue photodetector, green photodetector or the red photodetector.

In some implementations of the pixelated wideband sensor assembly, at least one of the first photodetector unit or the second photodetector unit is at least partially embedded in a substrate.

Another example aspect of the present disclosure is directed to a pixelated wideband sensor. The pixelated wideband sensor includes a pixel array comprising multiple pixels. Each pixel includes a first photodetector unit comprising a first photodetector configured to receive a first optical signal within a first wavelength range and to generate photo-carriers in response to the first optical signal. Each pixel also includes a second photodetector unit comprising a second photodetector configured to receive at least a second optical signal within a second wavelength range and to generate photo-carriers in response to the second optical signal, wherein the first wavelength range is outside a visible range and the second wavelength range is within the visible range. Each pixel also includes a light source array comprising multiple light sources and configured to emit light toward a target, wherein the light source array is disposed under the pixel array. Each pixel also includes a shielding layer between the light source array and the pixel array and configured to block the light emitted from the light sources from being absorbed by the first photodetector unit and the second photodetector unit.

In some implementations of the pixelated wideband sensor assembly, the multiple light sources comprise light-emitting diodes or vertical-cavity surface-emitting lasers.

In some implementations, the pixelated wideband sensor assembly further includes an integrated circuit layer between the pixel array and the shielding layer, wherein the integrated circuit layer comprises a control circuit configured to control the pixel array.

In some implementations of the pixelated wideband sensor, the pixel array is a two-dimensional array.

In some implementations of the pixelated wideband sensor assembly, the first photodetector comprises a first absorption region comprising germanium, and the second photodetector comprises RGB photodetectors comprising silicon.

In some implementations, the second photodetector includes at least one of the blue photodetector, the green photodetector or the red photodetector.

In some implementations of the pixelated wideband sensor assembly, at least one of the first photodetector unit or the second photodetector unit is at least partially embedded in a substrate.

Other example aspects of the present disclosure are directed to systems, methods, apparatuses, sensors, computing devices, tangible non-transitory computer-readable media, and memory devices related to the described technology.

These and other features, aspects and advantages of various embodiments will become better understood with reference to the following description and appended claims. The accompanying drawings, which are incorporated in and constitute a part of this specification, illustrate embodiments of the present disclosure, and together with the description, serve to explain the related principles.

BRIEF DESCRIPTION OF THE DRAWINGS

The foregoing aspects and many of the attendant advantages of this application will become more readily appreciated by reference to the following detailed description, when taken in conjunction with the accompanying drawings, wherein:

FIG. 1 illustrates a schematic diagram of the optical detector module, according to some embodiments.

FIG. 3A through FIG. 3E illustrate timing diagrams of optical detector module operated by the method, according to some embodiments.

DETAILED DESCRIPTION

Figure 2A:
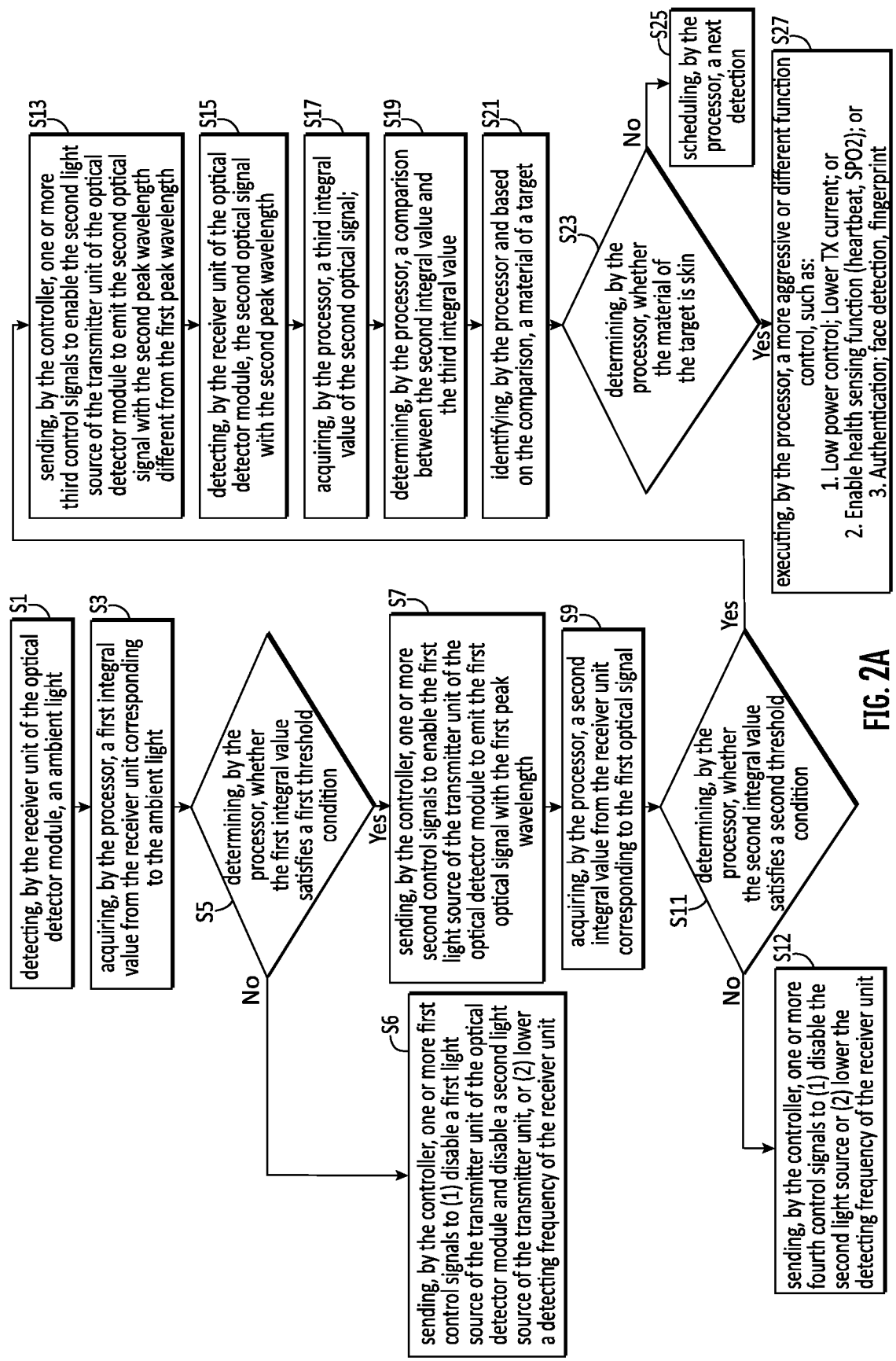
FIG. 2A through FIG. 2E illustrate flow charts of a method for operating the optical detector module, according to some embodiments.

An optical detector module can be used to implement proximity sensing function by detecting ambient light outside of the optical detector module. An optical detector module can be further used to implement other active functions such as material detection (e.g., skin) or depth-sensing by emitting one or more optical signals (e.g., light pulses at a specific wavelength) and detecting the reflected optical signals. As more functions are implemented in an optical detector module, power management for the optical detector module becomes important. The disclosure provides technical solutions for actively monitoring detection threshold(s) of an optical detector module to achieve better power management. In some embodiments, such solutions are useful for photodetectors having a wide sensing bandwidth, such as a photodetector formed in germanium or a photodetector comprising an absorption region comprising germanium.

FIG. 1 illustrates an optical detector module 10. The optical detector module 10 includes a receiver unit 100, a transmitter unit 200, a processor 300 in electrical communication with the receiver unit 100, and a controller 400 in electrical communication with the receiver unit 100, the processor 300, and/or the transmitter unit 200. In some embodiments, the transmitter unit 200 includes a first light source 201 configured to emit a first optical signal with a first peak wavelength and a second light source 202 configured to emit a second optical signal with a second peak wavelength. In some embodiments, the first peak wavelength or the second peak wavelength is in an NIR or SWIR wavelength range equal to or greater than 700 nm, such as 850 nm, 940 nm, 1050 nm, 1064 nm, 1310 nm, 1350 nm, 1450 nm, or 1550 nm or any suitable wavelength range. In some embodiments, the first peak wavelength is different from the second peak wavelength. In some embodiments, the first peak wavelength is substantially 1050 nm, and the second peak wavelength is substantially 1450 nm. In some embodiments, the receiver unit 100 includes one or more photodetectors (e.g., germanium photodetector) configured to generate photo-carriers in response to receiving an incoming optical signal.

FIG. 2A through FIG. 2E illustrate flow charts of a method for operating the optical detector module 10. FIG. 3A through FIG. 3E illustrate timing diagrams of the optical detector module 10 operated by the method, according to some embodiments. In some embodiments, as illustrated in FIG. 3A, the processor 300 of the optical detector module 10 may measure multiple time periods A1 through A13 from time slot T0 through T13, where an ambient light always exists and the receiver unit 100 is on during those time periods A1 though A13. The processor 300 acquires an integral value from the receiver unit 100 corresponding to each time period. The first light source 201 and/or the second light source 202 can be controlled to be selectively turned on by the controller 400 based on the determination by the processor 300 as described in detail below.

In some embodiments, as illustrated in FIG. 3B, the processor 300 of the optical detector module 10 may measure multiple time periods B1 through B13 from time slot T0 through T13, where an ambient light always exists. The processor 300 acquires an integral value from the receiver unit 100 corresponding to the time period where the receiver unit 100 is on. In some embodiments, the detecting frequency of the receiver unit 100 may be controlled by the controller 400 based on the determination by the processor 300 as described in detail below.

Figure 3B:
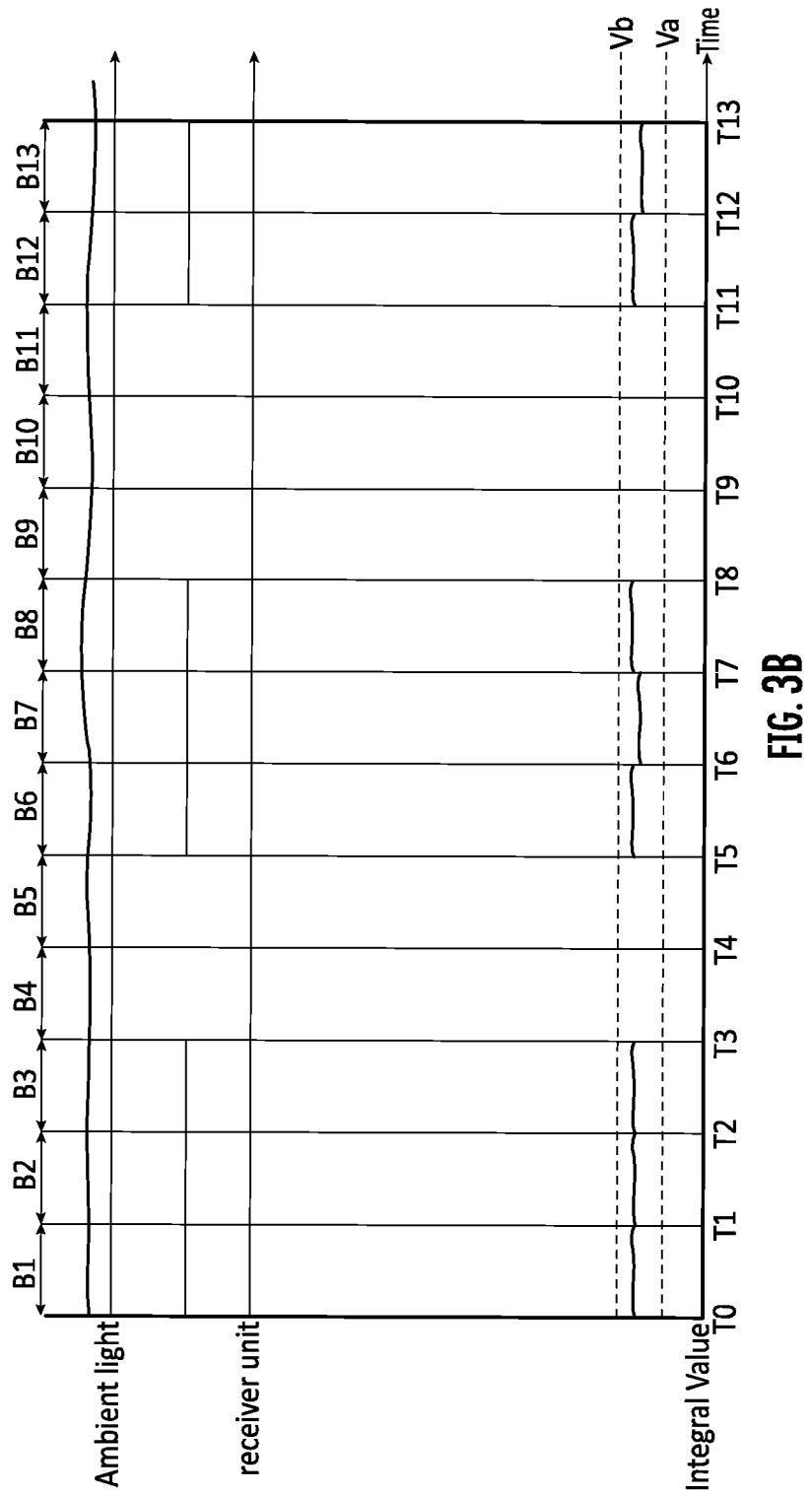
Figure 3C:
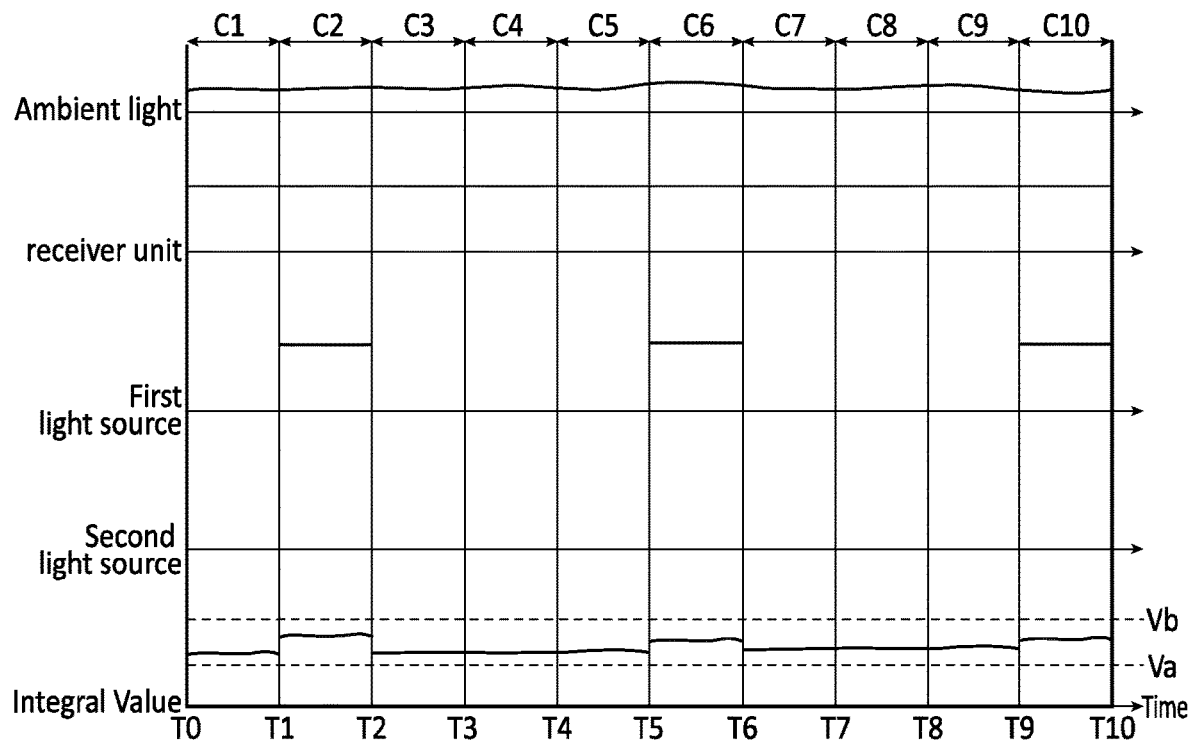

In some embodiments, as illustrated in FIG. 3C, the processor 300 of the optical detector module 10 may measure multiple time periods C1 through C10 from time slot T0 through T10, where an ambient light always exists and the receiver unit 100 is on during those time periods C1 though C10. The processor 300 acquires an integral value from the receiver unit 100 corresponding to each time period. In some embodiments, based on the determination by the processor 300 as described in detail below, the frequency of the first optical signal emitted by the first light source 201 may be controlled so as to control the detecting frequency of the receiver unit 100.

Figure 3D:
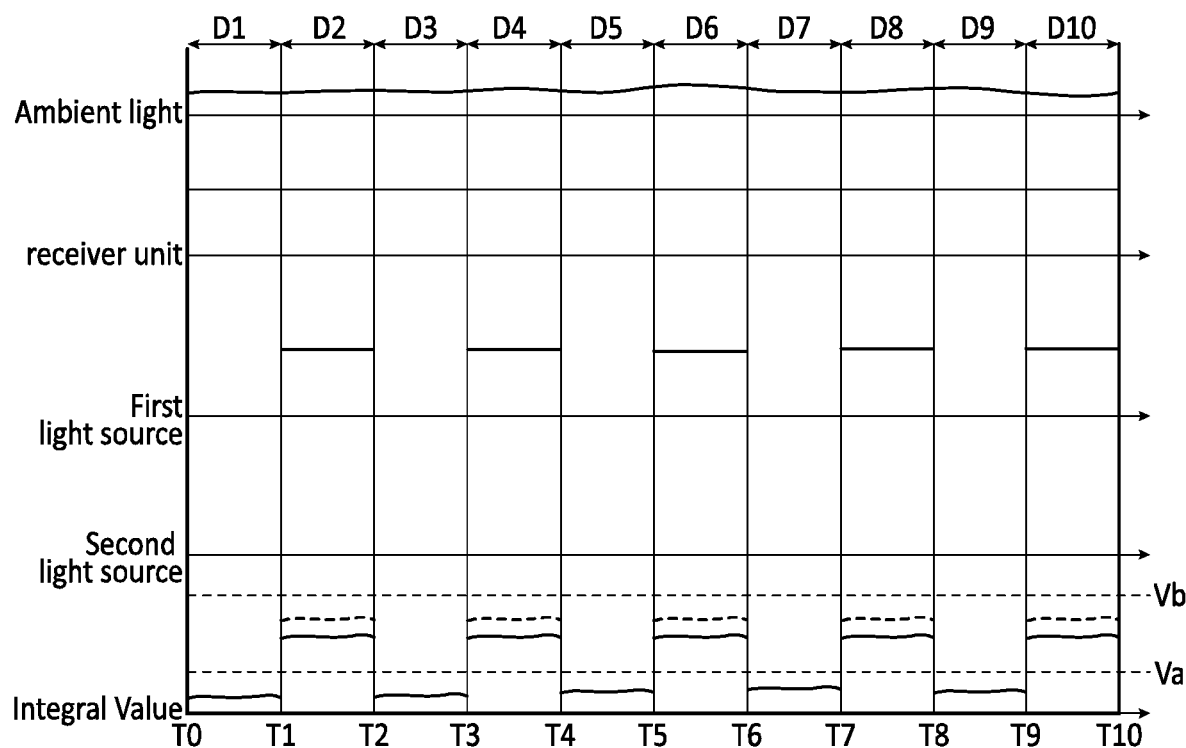

In some embodiments, as illustrated in FIG. 3D, the processor 300 of the optical detector module 10 may measure multiple time periods D1 through D10 from time slot T0 through T10, where an ambient light always exists and the receiver unit 100 is on during those time periods D1 though D10. The processor 300 acquires an integral value from the receiver unit 100 corresponding to each time period. In some embodiments, the integral value in solid line in target time slot (e.g., T1 through T2, T3 through T4, T5 through T6, T7 through T8, T9 through T10) may be obtained by adjusting a foreground integral value in dotted line as described in detail below.

Figure 3E:
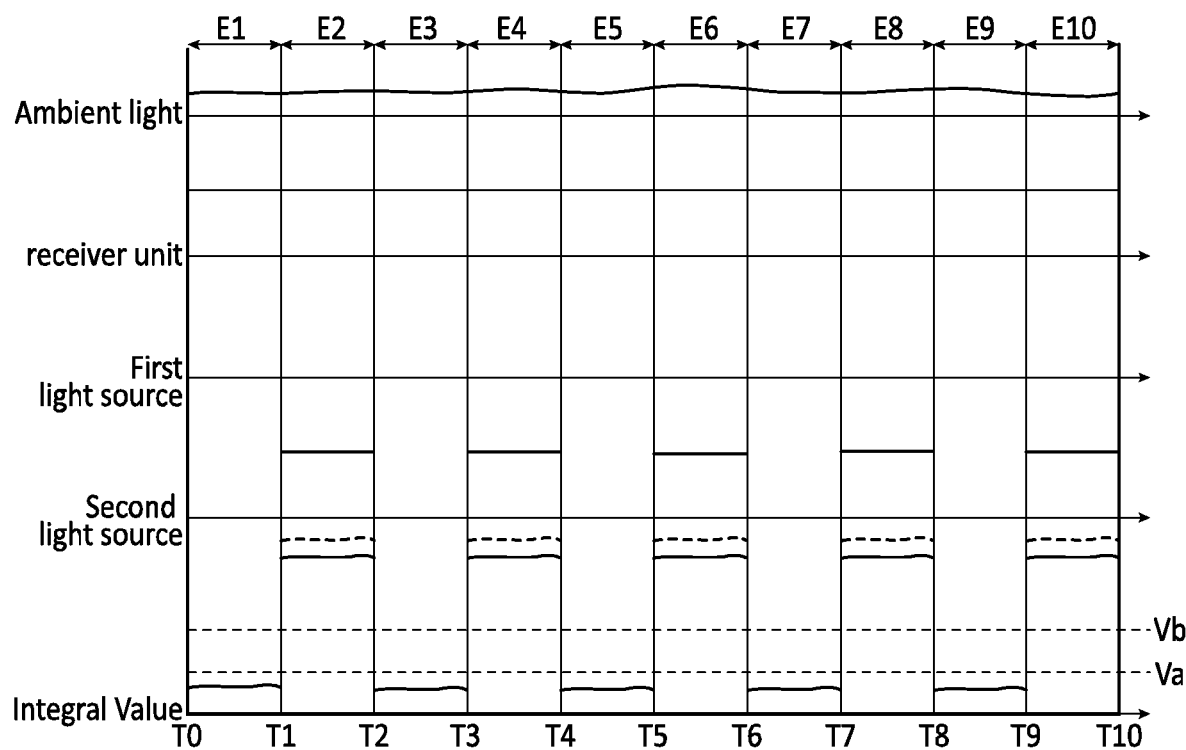

In some embodiments, as illustrated in FIG. 3E, the processor 300 of the optical detector module 10 may measure multiple time periods E1 through E10 from time slot T0 through T10, where an ambient light always exists and the receiver unit 100 is on during those time periods E1 though E10. The processor 300 acquires an integral value from the receiver unit 100 corresponding to each time period. In some embodiments, the integral value in solid line in target time slot (e.g., T1 through T2, T3 through T4, T5 through T6, T7 through T8, T9 through T10) may be obtained by adjusting a foreground integral value in dotted line as described in detail below.

In some embodiments, along with the description of FIG. 2A through FIG. 2E, the timing diagrams as illustrated in FIG. 3A through FIG. 3E are example embodiments for describing some sequences of the steps of operating the optical detector module 10, the arrangement of the time slots should not be limited to the arrangement shown in FIG. 3A through FIG. 3E. For example, in some embodiments, the time period A4 in FIG. 3A may be inserted between the time period E1 the time period E2, between the time period E3 the time period E4, time period E5 the time period E6, time period E7 the time period E8, and time period E9 the time period E10.

Referring to S1 in FIG. 2A, the optical detector module 10 detects, by the receiver unit 100, an ambient light. For example, the ambient light can be stray light from the environment, where the wavelength(s) of the stray light may or may not match the operating wavelength of the first light source 201 or the second light source 202.

Referring to S3 in FIG. 2A, the optical detector module 10 acquires, by the processor 300, a first integral value from the receiver unit 100 corresponding to the ambient light. For example, referring to FIG. 3A, the integral values in time periods A1, A3, A9, A11, A12, A13 correspond to the ambient light because neither the first light source 201 nor the second light source 202 is on during those periods.

Referring to S5 in FIG. 2A, in some embodiments, the optical detector module 10 may determine, by the processor 300, whether the first integral value satisfies a first threshold condition. For example, referring to FIG. 3A, the processor 300 may determine whether the first integral value (e.g., integral value of A1, A3, A9, A11, A12, A13) is lower than a first value Va.

In some embodiments, the first value Va comprises a predetermined value. In other embodiments, the first value Va comprises a dynamically determined value that can be refined and/or adjusted periodically based on various operating parameters (e.g., environmental conditions, personalized applications, etc.)

Referring to S6 in FIG. 2A, in some embodiments, in response to determining that the first integral value does not satisfy the first threshold condition (e.g. the first integral value exceeds the first value Va), the optical detector module 10 may send, by the controller 400, one or more first control signals to disable the first light source 201 of the transmitter unit 200 of the optical detector module 10 configured to emit the first optical signal with the first peak wavelength, and disable the second light source 202 of the transmitter unit 200 of the optical detector module 10 configured to emit the second optical signal with the second peak wavelength. Referring to FIG. 3A as an example, during time period A11, the first integral value corresponding to the ambient light is above the first value Va, the processor 300 determines that the first integral value does not satisfy the first threshold condition, which may further mean the ambient light is enough or the receiver unit 100 is not in proximity with an object. As the result, the controller 400 sends one or more first control signals to disable both the first light source 201 and the second light source 202 during time period A12.

In some other embodiments, in response to determining that the first integral value does not satisfy the first threshold condition (e.g., the first integral value exceeds the first value Va), the optical detector module 10 may send, by the controller 400, one or more first control signals to lower the detecting frequency or detecting time of the receiver unit 100. Referring to FIG. 3B as an example, the receiver unit 100 may be turned on and off every other cycle. In some embodiments, lower the detecting frequency of the receiver unit 100 may include lowering an operating frequency or operating time of the receiver unit 100 such as reducing the turn-on time of the receiver unit 100, for example, time period B12 to time period B13 compared with the time period B1 through time period B3 and time period B6 through time period B9. In some embodiments, lowering the operating frequency or operating time of the receiver unit 100 may include increasing the turn-off time of the receiver unit 100, for example, time period B9 through time period B11 compared with time period B4 through time period B5.

Referring to S7 in FIG. 2A, in some embodiments, in response to determining that the first integral value satisfies the first threshold condition (e.g., the first integral value is equal or lower than the first value Va), the optical detector module 10 may send, by the controller 400, one or more second control signals to enable the first light source 201 of the transmitter unit 200 of the optical detector module 10 to emit the first optical signal with the first peak wavelength. Referring to FIG. 3A as an example, during time period A1, the first integral value corresponding to the ambient light is below the first value Va, the processor 300 determines that the first integral value satisfies the first threshold condition, which may further mean the receiver unit 100 is in proximity with an object or the ambient light is weak. As the result, the controller 400 enables the first light source 201 to emit the first optical signal during time period A2.

According to the present disclosure, since the first light source 201 is enabled based on a threshold condition (e.g., the first threshold condition) regarding the ambient light, the optical module 10 can benefit from power saving. In other words, when an ambient light is strong enough, which fails to satisfy the first threshold condition, the first light source(s) and the second light source(s) may be set to a sleep mode for power saving, or the operating frequency of the receiver unit can be lower for power saving.

Referring to S9 in FIG. 2A, in some embodiments, in response to determining that the first integral value satisfies the first threshold condition (e.g., the first integral value is equal or lower than the first value Va), the optical detector module 10 may acquire, by the processor 300, a second integral value (e.g., integral value of time period A2, A4, A6, A8, A10 in FIG. 3A) from the receiver unit 100 corresponding to the first optical signal and ambient light received by the receiver unit 100.

In some embodiments, the second integral value may be adjusted based on a collection of the ambient light and/or reflected light over time, thereby averaging the ambient light to get a smoother or calibrated background value, so as to acquire the second integral value corresponding to the first optical signal more accurately. Some example embodiments of S9 in FIG. 2A are described in FIG. 2B, FIG. 2C and FIG. 3D below.

Figure 2B:
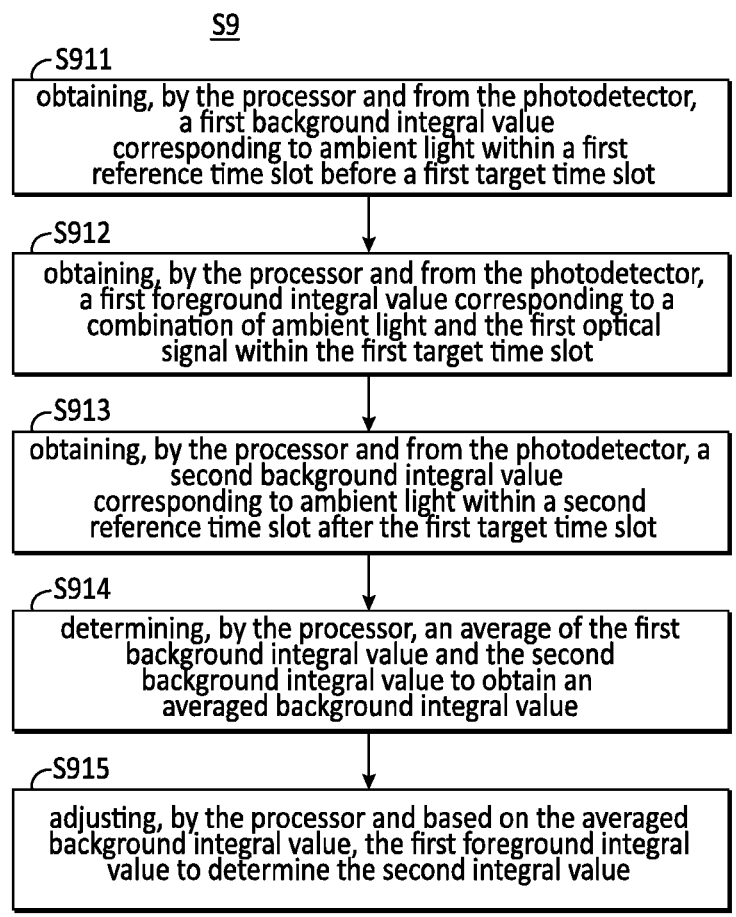

FIG. 2B shows one example flow chart for acquiring the second integral value. Referring to S911 in FIG. 2B and referring to FIG. 3D, in some embodiments, the optical detector module 10 may obtain, by the processor 300 and from the receiver unit 100, a first background integral value (e.g., the integral value of D1 in FIG. 3D) corresponding to ambient light within a first reference time slot (e.g., T0 through T1 in FIG. 3D) before a first target time slot (e.g., T1 through T2 in FIG. 3D). In some embodiments, in the reference time slot (e.g., the first reference time slot and the second reference time slot mentioned below), neither the first light source 201 nor the second light source 202 is on. In some embodiments, in the first target time slot, the first light source 201 is on and the second light source 202 is off.

Referring to S912 in FIG. 2B and referring to FIG. 3D, the optical detector module 10 may further obtain, by the processor 300 and from the receiver unit 100, a first foreground integral value (e.g., integral value shown in dotted line of D2 in FIG. 3D) corresponding to a combination of ambient light and the first optical signal within the first target time slot (e.g., T1 through T2 in FIG. 3D).

Referring to S913 in FIG. 2B and referring to FIG. 3D, the optical detector module 10 may further obtain, by the processor 300 and from the receiver unit 100, a second background integral value (e.g., the integral value of D3 in FIG. 3D) corresponding to ambient light within a second reference time slot (e.g., T2 through T3 in FIG. 3D) after the first target time slot (e.g., T1 through T2 in FIG. 3D).

Referring to S914 in FIG. 2B and referring to FIG. 3D, the optical detector module 10 may further determine, by the processor 300, an average of the first background integral value (e.g., the integral value of D1 in FIG. 3D) and the second background integral value (e.g., the integral value of D3 in FIG. 3D) to obtain an averaged background integral value.

Referring to S915 in FIG. 2B and referring to FIG. 3D, the optical detector module 10 may further adjust, by the processor 300 and based on the averaged background integral value, the first foreground integral value (e.g., integral value shown in dotted line of D2 in FIG. 3D) to determine the second integral value (e.g., integral value shown in solid line of D2 in FIG. 3D). Accordingly, the second integral value shown in solid line corresponds to the first optical signal more accurately.

Figure 2C:
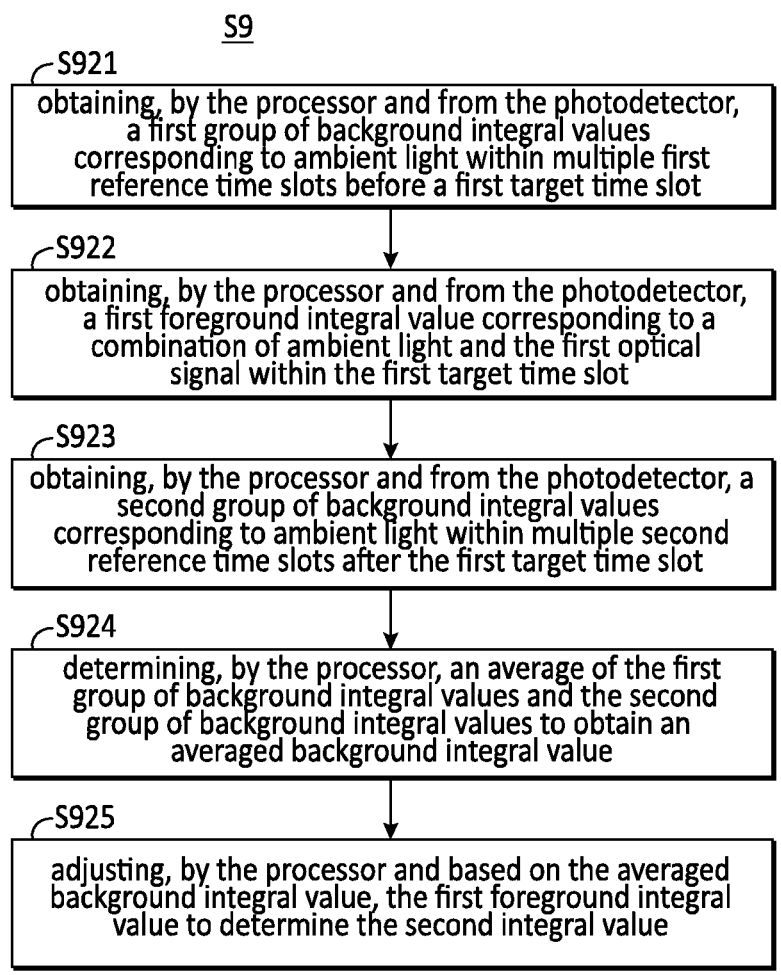

FIG. 2C shows another example flow chart for acquiring the second integral value. Referring to S921 in FIG. 2C and referring to FIG. 3D, the optical detector module 10 may obtain by the processor 300 and from the receiver unit 100, a first group of background integral values (e.g., the integral values of D1, D3, and D5 in FIG. 3D) corresponding to ambient light within multiple first reference time slots (e.g., T0 through T1, T2 through T3, and T4 through T5 in FIG. 3D) before a first target time slot (e.g., T5 through T6 in FIG. 3D). In some embodiments, as mentioned before, in the reference time slot (e.g., the first reference time slot and the second reference time slot), neither the first light source 201 nor the second light source 202 is on.

Referring to S922 in FIG. 2C and referring to FIG. 3D, the optical detector module 10 may further obtain, by the processor 300 and from the receiver unit 100, a first foreground integral value (e.g., integral value shown in dotted line of D6 in FIG. 3D) corresponding to a combination of ambient light and the first optical signal within the first target time slot (e.g., T5 through T6 in FIG. 3D).

Referring to S923 in FIG. 2C and referring to FIG. 3D, the optical detector module 10 may further obtain, by the processor 300 and from the receiver unit 100, a second group of background integral values (e.g., the integral values of D7, D9 in FIG. 3D) corresponding to ambient light within multiple second reference time slots (e.g., T6 through T7, T8 through T9 in FIG. 3D) after the first target time slot (e.g., T5 through T6 in FIG. 3D).

Referring to S924 in FIG. 2C and referring to FIG. 3D, the optical detector module 10 may further determine, by the processor 300, an average of the first group of background integral values (e.g., the integral values of D1, D3, D5 in FIG. 3D) and the second group of background integral values (e.g., the integral values of D7, D9 in FIG. 3D) to obtain an averaged background integral value.

Referring to S925 in FIG. 2C and referring to FIG. 3D, the optical detector module 10 may further adjust, by the processor 300 and based on the averaged background integral value, the first foreground integral value (e.g., integral value shown in dotted line of D6 in FIG. 3D) to determine the second integral value (e.g., integral value shown in solid line of D6 in FIG. 3D). Accordingly, the second integral value shown in solid line corresponds to the first optical signal more accurately.

Referring back to S11 in FIG. 2A and referring to FIG. 3A, the optical detector module 10 determines, by the processor 300, whether the second integral value satisfies a second threshold condition, e.g., whether the second integral value (e.g., integral value of A2, A4, A6, A8, A10 in FIG. 3A) equals or exceeds a second value Vb. In some embodiments, the second value Vb comprises a predetermined value. In other embodiments, the second value Vb comprises a dynamically determined value that can be refined and/or adjusted periodically based on various operating parameters (e.g., environmental conditions, personalized applications, etc.)

In S13, in some embodiments, in response to determining that the second integral value satisfies the second threshold condition (e.g. the second integral value equals or exceeds the second value Vb), the optical detector module 10 may send, by the controller 400, one or more third control signals to enable the second light source 202 of the transmitter unit 200 of the optical detector module 10 to emit the second optical signal with the second peak wavelength, where the first peak wavelength is different from the second peak wavelength. Referring to FIG. 3A as an example, during time period A4, the second integral value corresponding to the first optical signal and the ambient light is above the second value Vb, the processor 300 determines that the second integral value satisfies the second threshold condition, which may further mean the receiver unit 100 is in proximity with the object. As the result, the controller 400 enables the second light source 202 during time period A5.

Referring to S12 in FIG. 2A, in some embodiments, in response to determining that the second integral value does not satisfy the second threshold condition (e.g., the second integral value is lower than the second value Vb), the optical detector module 10 may send, by the controller, one or more fourth control signals to disable the second light source 202. Referring to FIG. 3A as an example, during time period A8, the second integral value corresponding to the first optical signal and the ambient light is below the second value Vb, the processor 300 determines that the second integral value does not satisfy the second threshold condition, which may further mean the object may be moved away from the receiver unit 100. As a result, the controller 400 disables the second light source 202 during time period A9 to save power.

In some other embodiments, in response to determining that the second integral value does not satisfy the second threshold condition (e.g., the second integral value is lower than the second value Vb), the optical detector module 10 may send, by the controller, one or more fourth control signals to lower the detecting frequency of the receiver unit 100. As mentioned above, referring to FIG. 3B as an example, lower the detecting frequency of the receiver unit 100 may include the receiver unit 100 turned on and off every other cycle. In some embodiments, lower the detecting frequency of the receiver unit 100 may include lowering an operating frequency or operating time of the receiver unit 100 such as reducing the turn-on time of the receiver unit 100, for example, time period B12 to time period B13 compared with the time period B1 through time period B3 and time period B6 through time period B9. In some embodiments, lower the detecting frequency of the receiver unit 100 may include increasing the turn-off time of the receiver unit 100, for example, time period B9 through time period B11 compared with time period B4 through time period B5.

In some embodiments, referring to FIG. 3A and FIG. 3C as another example, if the optical detector module 10 is disposed under strong ambient light, after multiple consecutive time periods where the first integral values equal or exceed the first value Va, e.g., time period A11 through A13 and C1, the first light source 201 may be turned on by the processor 300 (e.g., time period C2 in FIG. 3C) so as to actively determine whether the second integral value satisfies the second threshold condition. In some embodiments, the first light source 201 may be turned on and off every other cycle so as to save power.

In some embodiments, the optical signal is reflected from a target object. For example, if an object is approaching the optical detector module 10, the second integral value may equal or exceed a predetermined value (e.g., second value Vb), which satisfies the second threshold condition. Accordingly, the second light source 202 will be enabled after receiving the third control signal.

According to the present disclosure, since the second light source 202 is enabled based on a threshold condition regarding the optical signal emitted by the first light source 201, the optical detector module 10 can benefit from power saving. In other words, the second light source 202 may be in a sleep mode when the second integral value fails to satisfy the second threshold condition. Therefore, the optical detector module 10 can further benefit from power saving.

Referring to S15 in FIG. 2A, in some embodiments, in response to determining that the second integral value satisfies the second threshold condition (e.g., the second integral value equals or exceeds the second value Vb), the optical detector module 10 may detect, by the receiver unit 100 of the optical detector module, the second optical signal with the second peak wavelength.

Referring to S17 in FIG. 2A, in some embodiments, the optical detector module 10 may acquire, by the processor 300, a third integral value corresponding to the second optical signal.

Referring to S19 in FIG. 2A, in some embodiments, the optical detector module 10 may determine, by the processor 300, a comparison of the second integral value and the third integral value. In some embodiments, a comparison of the second integral value and the third integral value may be implemented as a ratio of the second integral value and the third integral value. In some other embodiments, a comparison of the second integral value and the third integral value may be implemented as a different relational combination of the second integral value and the third integral value (e.g., a difference between the second integral value and the third integral value).

Referring to S21 in FIG. 2A, in some embodiments, the optical detector module 10 may identify, by the processor 300 and based on the comparison (or other suitable relationship between the second integral value and the third integral value), a material of a target. In some embodiments, the material identified in S21 comprises human skin, wood or fabric. For example, if the ratio of the second integral value and the third integral value is between 0.8 and 1.2, the material can be determined to be human skin.

Identifying a material of a target can be useful for a variety of applications. In an example application concerning robotic vacuums or other robots that maneuver along a ground surface, the target can correspond to the ground surface. Determining whether the ground surface is carpet, hard floor, or other material can help optimize functionality of a robotic apparatus relative to navigation, cleaning, or other functions.

In another application concerning food freshness analysis, the target can correspond to a consumable food item (e.g., a fruit, vegetable, coffee bean, etc.). Detection of water ingredients or water composition of a consumable food item can help to characterize the material according to a range of desired freshness of the food item.

In yet another application concerning object detection, the target can correspond to an object detected in an environment of a robot such as a self-driving vehicle. Detection of a material associated with a target object can help to determine a classification of the object as a vehicle, a pedestrian, or other item.

In a still further application concerning smart wireless earbuds, the disclosed technology can be used to detect when a wireless earbud is put into a human ear and when it is pulled out of a human ear. For example, the determination (e.g., at S5) whether the first integral value satisfies the first threshold condition can be based on ambient light signals that effectively monitor whether an optical detector module within a smart wireless earbud is in or near an aperture. After it is determined that the earbud is in or near an aperture, a subsequent determination (e.g., based on S11-S23) can be employed to determine whether the earbud is proximate to human skin. If the material of a target is determined at S23 to be human skin, then it is likely that the wireless earbud has been placed into a human ear as opposed to being placed on a table, into an earbud case, or proximate to a different surface. Verification of proper placement of a smart wireless earbud can be employed to provide benefits such as power saving, performance enhancement, and the like.

Referring to S23 in FIG. 2A, the optical detector module 10 may determine, by the processor 300 and based on the identification in S21 of the material of the target, whether the material of the target is skin.

Referring to S25 in FIG. 2A, in response to determining that the material of the target is not skin, the optical detector module 10 may schedule a next detection. Scheduling a next detection can include routing the method back to detecting, by the receiver unit 100 of the optical detector module 10, an ambient light (e.g., S1 in FIG. 2A).

Referring to S27 in FIG. 2A, in response to determining at S23 that the material of the target is skin, the optical detector module 10 may execute, by the processor 300, a different function control.

In some embodiments, the function control executed at S27 can include implementing a low power control mode within the optical detector module 10. For example, a low power control mode can include shifting one or more of the multiple light sources (e.g., first light source 201 and/or second light source 202 in FIG. 1) into a sleep mode for power savings. In another example, a low power control mode can additionally or alternatively include reducing the operating frequency of the receiver unit 100 so that less operating power is expended for at least a period of time.

In some embodiments, the function control executed at S27 can include lowering a current level utilized by the transmitter unit Tx (e.g., transmitter unit 200 in FIG. 1). Because a determination has been made at S23 that the material of the target is skin, there is no need to use high current for additional sensing operations.

In some embodiments, the function control executed at S27 can include enabling, by the processor 300, a health sensing function. For example, a health sensing function can include determining a health parameter of a human operator of a device (e.g., fitness tracker or other wearable consumer computing device, health monitoring device or other medical computing device) that includes the optical detector module 10. Example health parameters that can be determined in a health sensing function at S27 can include a heartrate or other parameter associated with a heartbeat, body temperature, saturation of peripheral oxygen level (e.g., SPO2 levels as measured by a pulse oximeter), or other health parameters that can be determined using optical sensing technology configured to discern a health parameter based on determination of the processor 300.

In some embodiments, enabling a health sensing function at S27 may involve increasing the current level utilized by the transmitter unit (e.g., 200) and TIA gain associated with a transimpedance amplifier in the receiver unit (e.g., 100) to obtain a more suitable signal for purposes of implementing the health sensing function. For example, an average LED-On current value can be obtained by the processor 300 during a phase of the method associated with proximity and skin detection (e.g., S21, S23 in FIG. 2A). Based on the determined average LED-On current value, operating signals can be modified during a phase of the method associated with the health sensing function (e.g., S27 in FIG. 2A). For example, a DC current can be implemented at the TIA input based on the determined average LED-On current value. TIA gain can then be increased to amplify the AC signal obtained during the health sensing function.

In some embodiments, enabling a health sensing function at S27 may additionally or alternatively involve increasing a sample frequency of obtained measurements to obtain better sample resolution for purposes of implementing the health sensing function.

In some embodiments, the function control executed at S27 can include executing a biometric authentication operation. For example, when the optical detector module 10 is included within a device (e.g., a computing device) operated by a human user, an authentication operation may be executed for permitting access by the human user to some or all of the functionality of the device. Biometric authentication operations may include, for example, fingerprint detection, face detection, optical detection, or the like. Technical advantages can be realized by determining at S23 that the material of the target is skin before implementing an authentication operation at S27. Such advantages include improving the success rate of proper biometric recognition and authentication as the processor will not be fooled by looking at a photograph of a fingerprint, face, etc.

In some embodiments, similarly to the second integral value, the third integral value may be adjusted based on a collection of the ambient light and/or reflected light over time, thereby averaging the ambient light to get a smoother or calibrated background value, so as to acquire the third integral value corresponding to the second optical signal more accurately. Some example embodiments of S17 in FIG. 2A are described in FIG. 2D, FIG. 2E and FIG. 3E below.

Figure 2D:
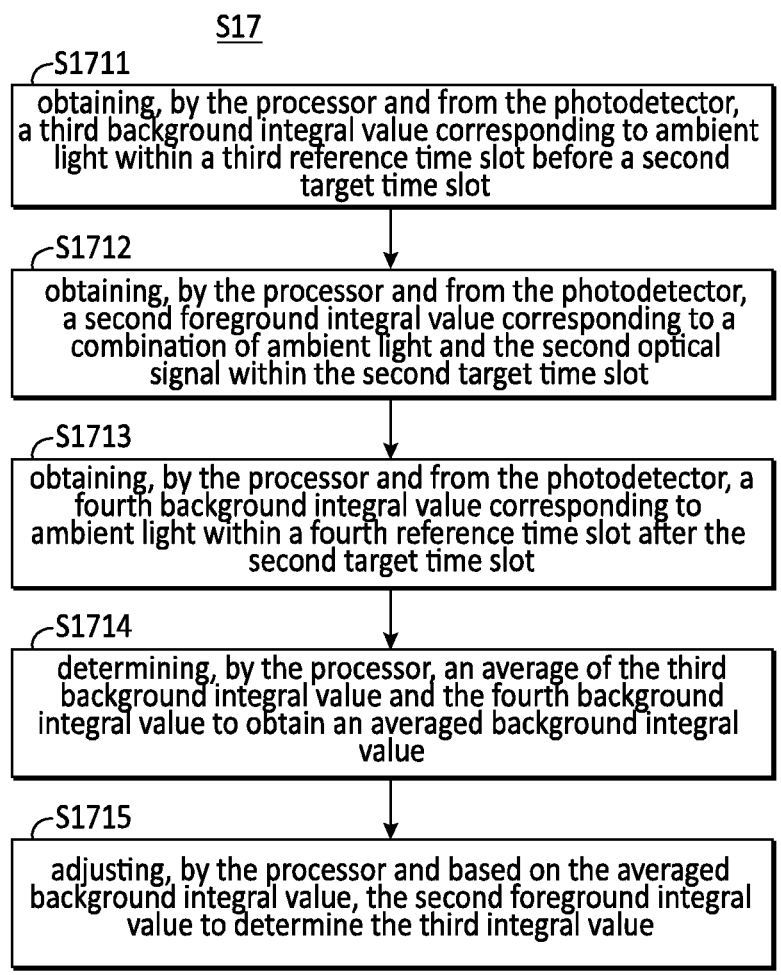

FIG. 2D shows one example flow chart for acquiring the third integral value. Referring to S17 in FIG. 2A, S1711 in FIG. 2D and FIG. 3E, in some embodiments, acquiring the third integral value at S17 in FIG. 2A further comprises obtaining, by the processor 300 and from the receiver unit 100, a third background integral value (e.g., the integral value of E1 in FIG. 3E) corresponding to ambient light within a third reference time slot (e.g., T0 through T1 in FIG. 3E) before a second target time slot (e.g., T1 through T2 in FIG. 3E). In some embodiments, in the reference time slot (e.g., the third reference time slot and the fourth reference time slot mentioned below), neither the first light source 201 nor the second light source 202 is on. In some embodiments, in the second target time slot, the first light source 201 is off and the second light source 202 is on.

Referring to S1712 in FIG. 2D and referring to FIG. 3E, in some embodiments, acquiring the third integral value at S17 further comprises obtaining, by the processor 300 and from the receiver unit 100, a second foreground integral value (e.g., integral value shown in dotted line of E2 in FIG. 3E) corresponding to a combination of ambient light and the second optical signal within the second target time slot (e.g., T1 through T2 in FIG. 3E)

Referring to S1713 in FIG. 2D and referring to FIG. 3E, in some embodiments, acquiring the third integral value at S17 further comprises obtaining, by the processor 300 and from the receiver unit 100, a fourth background integral value (e.g., the integral value of E3 in FIG. 3E) corresponding to ambient light within a fourth reference time slot after the second target time slot (e.g., T1 through T2 in FIG. 3E).

Referring to S1714 in FIG. 2D and referring to FIG. 3E, in some embodiments, acquiring the third integral value at S17 further comprises determining, by the processor 300, an average of the third background integral value (e.g., the integral value of E1 in FIG. 3E) and the fourth background integral value (e.g., the integral value of E3 in FIG. 3E) to obtain an averaged background integral value.

Referring to S1715 in FIG. 2D and referring to FIG. 3E, in some embodiments, acquiring the third integral value at S17 further comprises adjusting, by the processor 300 and based on the averaged background integral value, the second foreground integral value (e.g., integral value shown in dotted line of E2 in FIG. 3E) to determine the third integral value (e.g., integral value shown in solid line of E2 in FIG. 3E). Accordingly, the third integral value shown in solid line corresponds to the second optical signal more accurately.

Figure 2E:
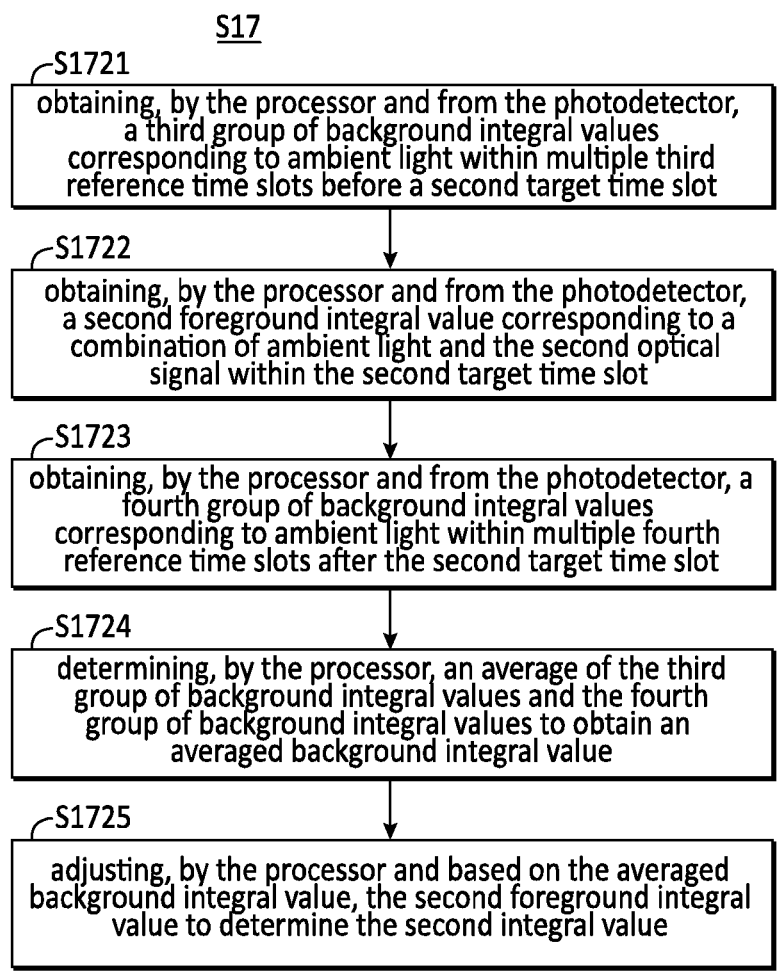

FIG. 2E shows another example flow chart for acquiring the third integral value. Referring to S1721 in FIG. 2E and referring to FIG. 3E, in some embodiments, acquiring the third integral value at S17 in FIG. 2A further comprises obtaining, by the processor 300 and from the receiver unit 100, a third group of background integral values (e.g., the integral values of E1, E3, E5 in FIG. 3E) corresponding to ambient light within multiple third reference time slots (e.g., T0 through T1, T2 through T3, T4 through T5 in FIG. 3E) before a second target time slot (e.g., T5 through T6 in FIG. 3E). In some embodiments, as mentioned before, in the reference time slot (e.g., the third reference time slot and the fourth reference time slot), neither the first light source 201 nor the second light source 202 is on.

Referring to S1722 in FIG. 2E and referring to FIG. 3E, in some embodiments, acquiring the third integral value at S17 further comprises obtaining, by the processor 300 and from the receiver unit 100, a second foreground integral value (e.g., integral value shown in dotted line of E6 in FIG. 3E) corresponding to a combination of ambient light and the second optical signal within the second target time slot (e.g., T5 through T6 in FIG. 3E).

Referring to S1723 in FIG. 2E and referring to FIG. 3E, in some embodiments, acquiring the third integral value at S17 further comprises obtaining, by the processor 300 and from the receiver unit 100, a fourth group of background integral values (e.g., the integral values of E7, E9 in FIG. 3E) corresponding to ambient light within multiple fourth reference time slots (e.g., T6 through T7, T8 through T9 in FIG. 3E) after the second target time slot (e.g., T5 through T6 in FIG. 3E).

Referring to S1724 in FIG. 2E and referring to FIG. 3E, in some embodiments, acquiring the third integral value at S17 further comprises determining, by the processor 300, an average of the third group of background integral values (e.g., the integral values of E1, E3, E5 in FIG. 3E) and the fourth group of background integral values (e.g., the integral values of E7, E9 in FIG. 3E) to obtain an averaged background integral value.

Referring to S1725 in FIG. 2E and referring to FIG. 3E, in some embodiments, acquiring the third integral value at S17 further comprises adjusting, by the processor 300 and based on the averaged background integral value, the second foreground integral value (e.g., integral value shown in dotted line of E6 in FIG. 3E) to determine the third integral value (e.g., integral value shown in solid line of E6 in FIG. 3E) (e.g., S1725 in FIG. 2E). Accordingly, the third integral value shown in solid line corresponds to the second optical signal more accurately.

It should be appreciated that the various time slots depicted in FIGS. 3A-3E for calculating integral values in accordance with the disclosed technology correspond to one illustrative example. The signal timing and analysis depicted in FIGS. 3A-3E utilize multiplexed time slots because the optical detector module 10 of FIG. 1 includes one transmitter unit (e.g., 200) including multiple light sources (e.g., first light source 201 and second light source 202) and one receiver unit (e.g., 100). Although a reduced number of transmitter and receiver components can be employed when desired for a reduction in cost and power consumption, other optical detector modules may use different signal timing analysis than the arrangements depicted in FIGS. 3A-3E when a different number of transmitters and receivers are utilized.

In some embodiments, the first reference time slot and the third reference time slot may be the same time slot, depending on the arrangement of the time slots. In some embodiments, the second reference time slot and the fourth reference time slot may be the same slot, depending on the arrangement of the time slots.

Figure 4:
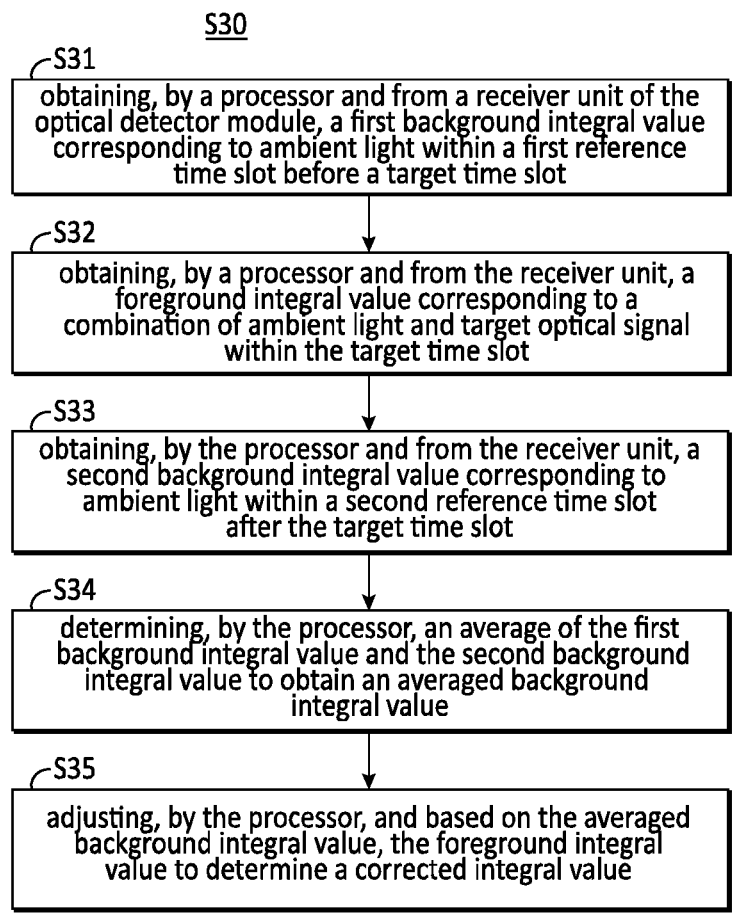
FIG. 4 illustrates a flow chart of the method for operating the optical detector module, according to some embodiments.

FIG. 4 illustrates a flow chart of the method for operating the optical detector module, according to some embodiments. The method S30 for operating an optical detector module 10 is disclosed. Referring to S31 in FIG. 4, the method S30 comprises obtaining, by the processor 300 and from a receiver unit 100 of the optical detector module 10, a first background integral value corresponding to ambient light within a first reference time slot before a target time slot. In some embodiments, in the reference time slot (e.g., the first reference time slot and the second reference time slot mentioned below), none of the light sources (e.g., the first light source 201 and the second light source 202) is on.

Referring to S32 in FIG. 4, the method S30 further comprises obtaining, by the processor 300 and from the receiver unit 100, a foreground integral value corresponding to a combination of ambient light and a target optical signal within the target time slot.

Referring to S33 in FIG. 4, the method S30 further comprises obtaining, by the processor 300 and from the receiver unit 100, a second background integral value corresponding to ambient light within a second reference time slot after the target time slot.

Referring to S34 in FIG. 4, the method S30 further comprises determining, by the processor 300, an average of the first background integral value and the second background integral value to obtain an averaged background integral value.

Referring to S35 in FIG. 4, the method S30 further comprises adjusting, by the processor 300 and based on the averaged background integral value, the foreground integral value to determine a corrected integral value.

According to the present disclosure, since the corrected integral value is obtained based on multiple background integral values, the signal output from the optical detector module 10 is with improved signal accuracy.

Figure 5:
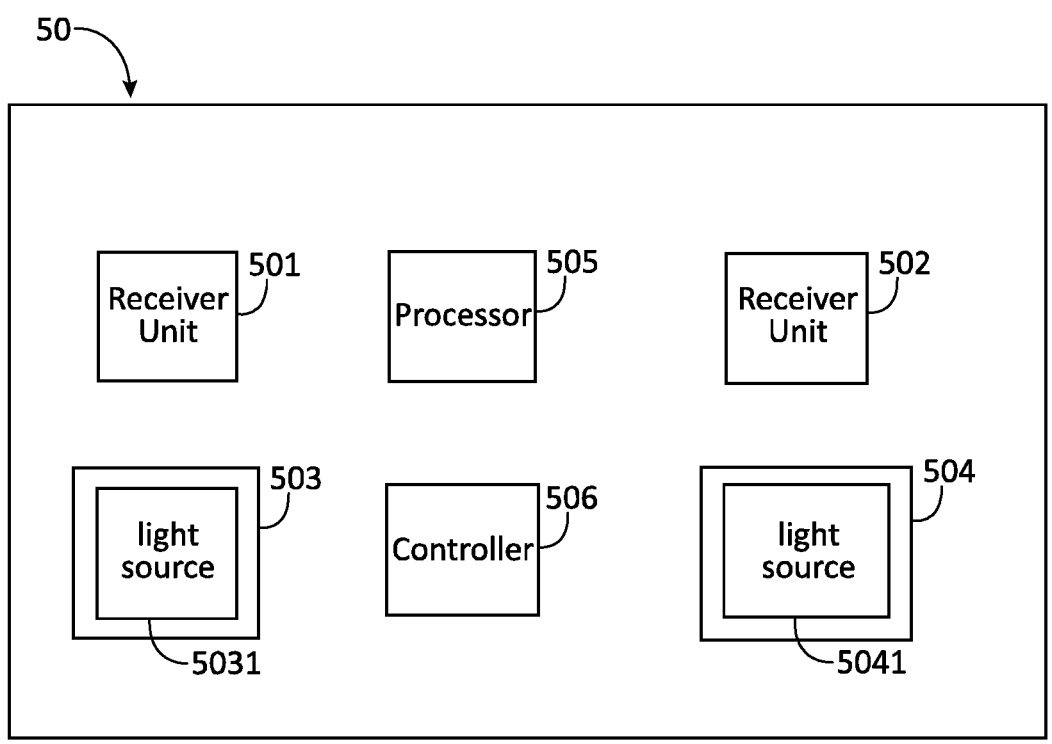
FIG. 5 illustrates a schematic diagram of the optical detector module, according to some embodiments.

FIG. 5 illustrates an optical detector module 50 having multiple receiver units 501 and 502 and multiple transmitter units 503 and 504 corresponding to the multiple receiver units 501, 502 respectively. Each of the multiple transmitter units 503, 504 includes a light source 5031, 5041) configured to emit an optical signal with a peak wavelength. The peak wavelengths of the optical signals emitted by the light sources 5031 and 5041 are substantially the same or different. The optical detector module 50 further includes a processor 505 in electrical communication with the receiver units 501, 502, and a controller 506 in electrical communication with the processor 505 and the transmitter units 503, 504. In some embodiments, the peak wavelength is in an invisible wavelength range equal to or greater than 700 nm, such as 850 nm, 940 nm, 1050 nm, 1064 nm, 1310 nm, 1350 nm, 1450 nm or 1550 nm or any suitable wavelength range. In some embodiments, each of the receiver unit 501, 502 includes one or more photodetectors configured to generate photo-carriers in response to receiving an incoming optical signal. In some embodiments, if the peak wavelengths of the optical signals emitted by the light sources 5031 and 5041 are different, to avoid cross talk between the receiver units 501 and 502, each of the receiver units 501 and 502 includes an optical filter configured to pass light having a wavelength range corresponding to the peak wavelength of the optical signals emitted by the light sources 5031 and 5041 respectively.

Figure 6:
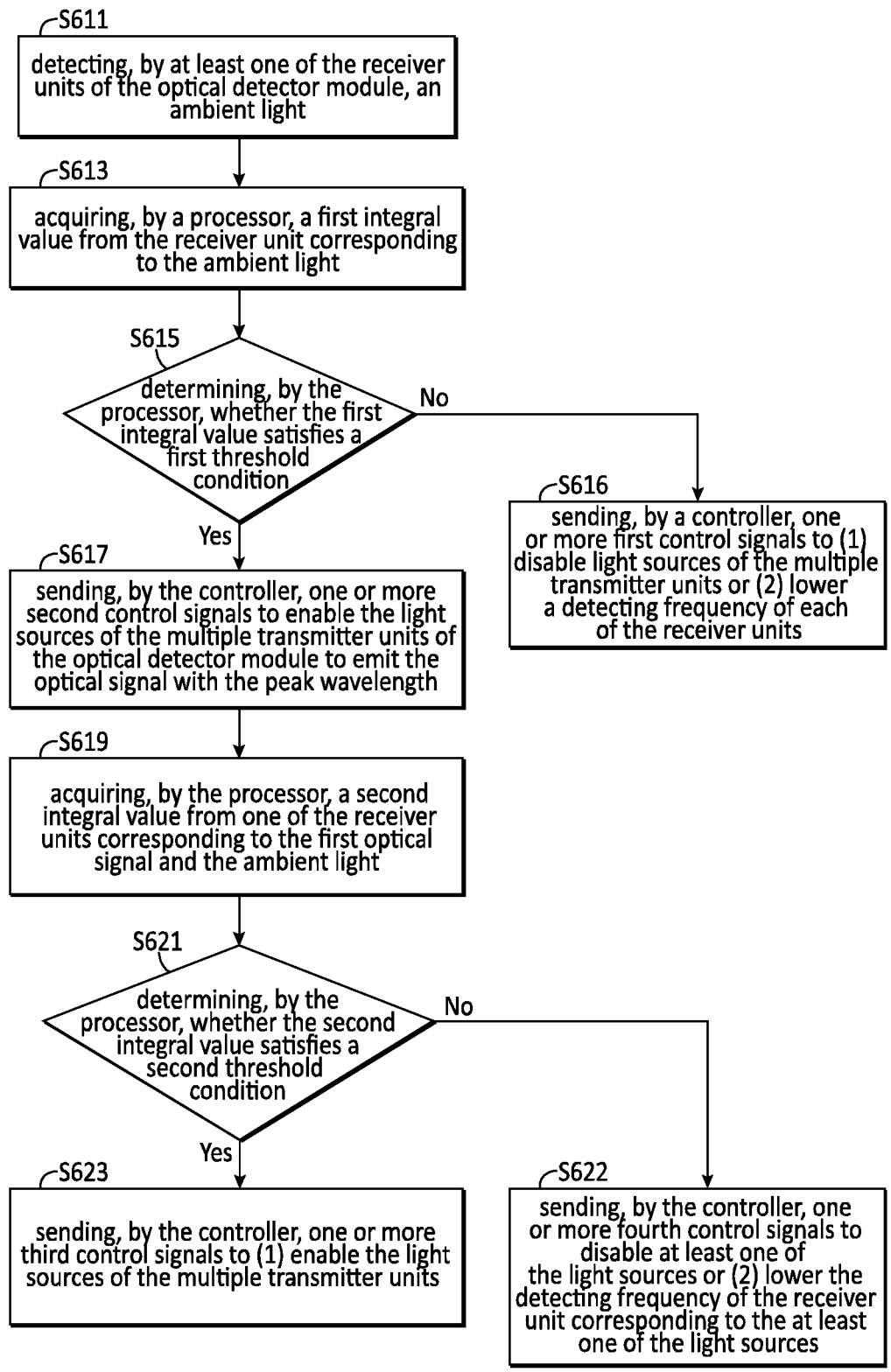
FIG. 6 illustrates a flow chart of the method for operating the optical detector module, according to some embodiments.

FIG. 6 illustrates a flow chart for operating the optical detector module 50. In S611, the optical detector module 50 detects, by at least one of the receiver units (e.g., 501) of the optical detector module 50, an ambient light.

In S613, in some embodiments, the optical detector module 50 acquires, by the processor 505, a first integral value from the receiver unit (e.g., 501) corresponding to the ambient light.

In S615, in some embodiments, the optical detector module 50 determines, by the processor 505, whether the first integral value satisfies a first threshold condition, for example, whether the first integral value is equal or lower than a first threshold value. In some embodiments, the first threshold value comprises a predetermined value. In other embodiments, the first threshold value comprises a dynamically determined value that can be refined and/or adjusted periodically based on various operating parameters (e.g., environmental conditions, personalized applications, etc.)

In S616, in response to determining that the first integral value does not satisfy the first threshold condition (e.g., the first integral value exceeds the first threshold value), the optical detector module 50 sends, by a controller 506, one or more first control signals to (1) disable light sources of the multiple transmitter units 503 and/or 504 or (2) lower a detecting frequency of each of the receiver units 501 and/or 502.

In S617, in response to determining that the first integral value satisfies the first threshold condition (e.g., the first integral value is equal or lower than the first threshold value), the optical detector module 50 sends, by the controller 506, one or more second control signals to enable one or more of the light sources 5041 and/or 5031 of the multiple transmitter units 503 and/or 504 of the optical detector module 50 to emit the first optical signal with a first peak wavelength.

In S619, in response to determining that the first integral value satisfies the first threshold condition (e.g., the first integral value is equal or lower than the first threshold value), the optical detector module 50 may further acquire, by the processor 505, at least a second integral value from one of the receiver units (e.g., 501) corresponding to the first optical signal with the first peak wavelength and the ambient light. In some embodiments, if multiple light sources emitted different peak wavelengths are turned on based on the threshold condition (e.g., the first threshold condition) regarding the ambient light, multiple integral values corresponding to different optical signals from the multiple receiver units 501, 502 can be obtained at the same period of time, which improves efficiency.

In S621, the optical detector module 50 may further determines, by the processor 505, whether the second integral value satisfies a second threshold condition, for example, whether the second integral value equal or exceeds a second threshold value.

In S623, in response to determining that the second integral value satisfies the second threshold condition (e.g., the second integral value equal or exceeds the second threshold value), the optical detector module 50 may send, by the controller 506, one or more third control signals to (1) enable another one or more of the light sources 5031 and/or 5041 of the multiple transmitter units 503, 504.

In S622, in response to determining that the second integral value does not satisfy the second threshold condition (e.g., the second integral value is lower than the second threshold value), the optical detector module 50 may send, by the controller 506, one or more fourth control signals to disable at least one of the light sources 5031 and/or 5041 or (2) lower the detecting frequency of the receiver unit 502 corresponding to the at least one of the light sources 5041 and/or 5031.

According to the present disclosure, since at least one of the multiple light sources is enabled based on a threshold condition regarding the optical signal emitted by another light source, the optical detector module can benefit from power saving when at least one of the light sources is in sleep mode or the operating frequency of the receiver unit can be lower for power saving. By selectively controlling the light sources, an optical detector module can be configured to illuminate light only when necessary. This process can be iteratively refined in order to achieve even greater realization of power reduction in an optical detector module.

The present disclosure further provides a pixelated wideband sensor that supports applications for multiple wavelength ranges, including visible (e.g., wavelength range 380 nm to 780 nm, or a similar wavelength range as defined by a particular application), near-infrared (NIR, e.g., wavelength range from 780 nm to 1400 nm, or a similar wavelength range as defined by a particular application) and short-wavelength infrared (SWIR, e.g., wavelength range from 1400 nm to 3000 nm, or a similar wavelength range as defined by a particular application) wavelength ranges. Combining multi-wavelength sensing over a wideband (e.g., visible and NIR) can enable short-range applications such as true wireless stereo (TWS), under-display fingerprint sensing, contactless or 3D fingerprint sensing, as well as camera and depth-sensing fusing on a single module platform. In some embodiments, aspects of the technology illustrated in FIGS. 7A-10B can be employed to implement the optical detector module in any one of FIGS. 1 through 5. However, other implementations can additionally or alternatively be employed.

Figure 7A:
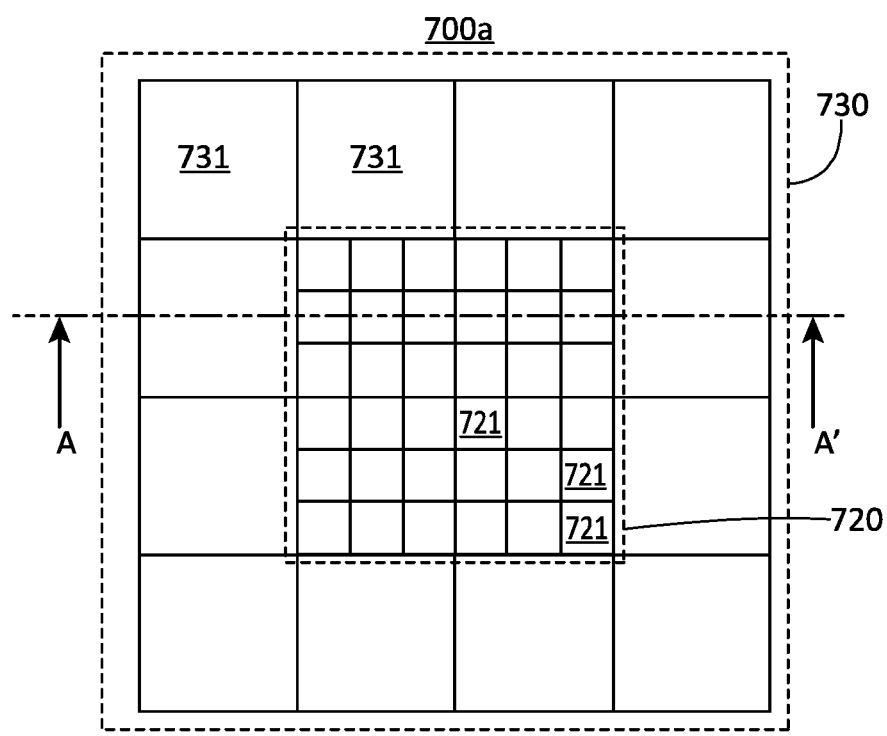
FIG. 7A illustrates a top view of exemplary embodiments of a pixelated wideband sensor.
Figure 7B:
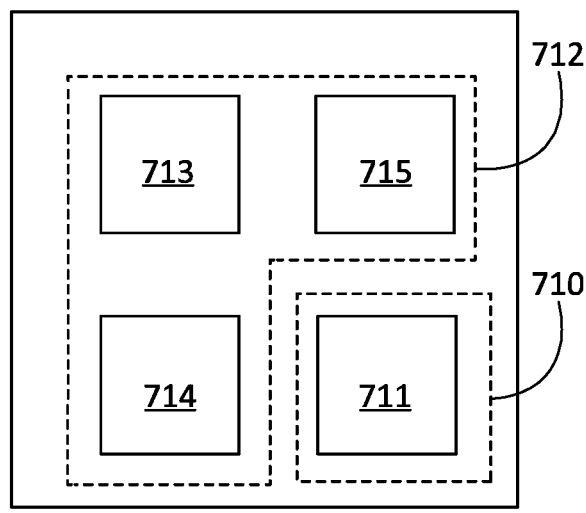
FIG. 7B illustrates exemplary embodiments of a pixel.

FIG. 7A illustrates a top view of exemplary embodiments of a pixelated wideband sensor. FIG. 7B illustrates exemplary embodiments of a pixel. The pixelated wideband sensor 700a comprises a carrier (e.g., element 780 in FIG. 7D, such as a PCB board or a substrate) and a pixel array 720 supported by the carrier 780. The pixel array 720 comprises multiple pixels 721 and may be a two-dimensional array. Referring to FIG. 7B, the multiple pixels 721 comprises a first photodetector unit 710 and a second photodetector unit 714. The multiple pixels 721 can be the same or different. For example, referring to FIG. 7B, the multiple pixels 721 can be the same, and each of the multiple pixels 721 includes a first photodetector unit 710 and a second photodetector unit 712. The first photodetector unit 710 includes a first photodetector 711 configured to receive a first optical signal within a first wavelength range and to generate photo-carriers in response to the first optical signal. In some embodiments, the first photodetector unit 710 may include multiple first photodetectors 711. The first wavelength range is in invisible range, for example, in IR region such as NIR region or SWIR region, for example, not less than 800 nm (e.g., 7800 to 2500 nm or 1400 nm to 3000 nm). In some embodiments, the first optical signal is reflected from a target object. In some embodiments, the first photodetector unit 710 is configured for depth sensing by direct or indirect time-of-flight (TOF) method. In some other embodiments, the first photodetector unit 710 is configured for proximity sensing. In some other embodiments, the first photodetector unit 710 is configured for image sensing.

The second photodetector unit 712 comprises a second photodetector (e.g., green photodetector 714, red photodetector 715 or blue photodetector 713) configured to receive at least a second optical signal within a second wavelength range and to generate photo-carriers in response to the second optical signal. The second wavelength range is in a visible range, for example, between about 380 nm and 780 nm. In some embodiments, the second photodetector unit 712 further includes a blue photodetector 713 configured to receive an optical signal in blue-colored band such as between about 380 nm and 495 nm, a green photodetector 714 configured to receive an optical signal in green-colored band such as between about 495 nm and 570 nm, and a red photodetector 715 configured to receive an optical signal in red-colored band such as between about 570 nm and 780 nm. In some embodiments, the second photodetector unit 712 is configured for image sensing.

Figure 7C:
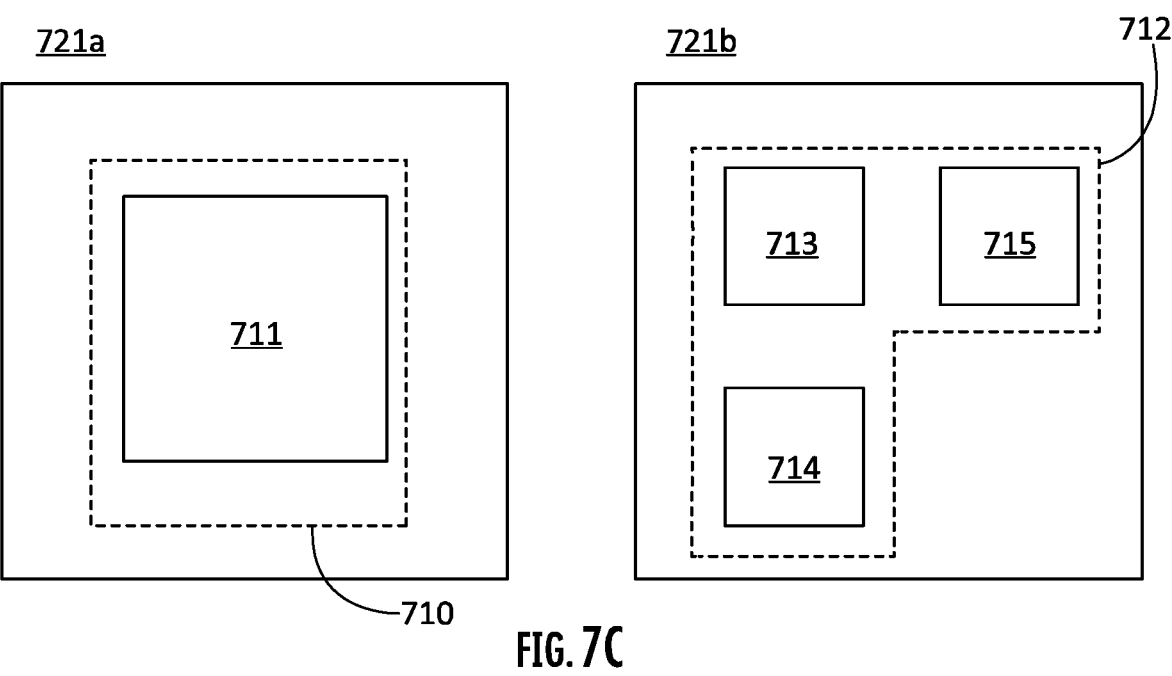
FIG. 7C illustrates exemplary embodiments of a pixel.

FIG. 7C illustrates another embodiment of pixels, where at least two of the multiple pixels 721 are different. For example, the pixel 721a includes the first photodetector unit 710 having the first photodetector 711. In some embodiments, the first photodetector unit 710 may also include multiple first photodetectors 711. The pixel 721b includes the second photodetector unit 712 having the blue photodetector 713, the green photodetector 714 and the red photodetector 715. As another example, the pixel array 720 may include four pixels, where each pixel includes a single photodetector (e.g., an IR photodetector, a red photodetector, a blue photodetector, or a green photodetector).

Figure 7D:
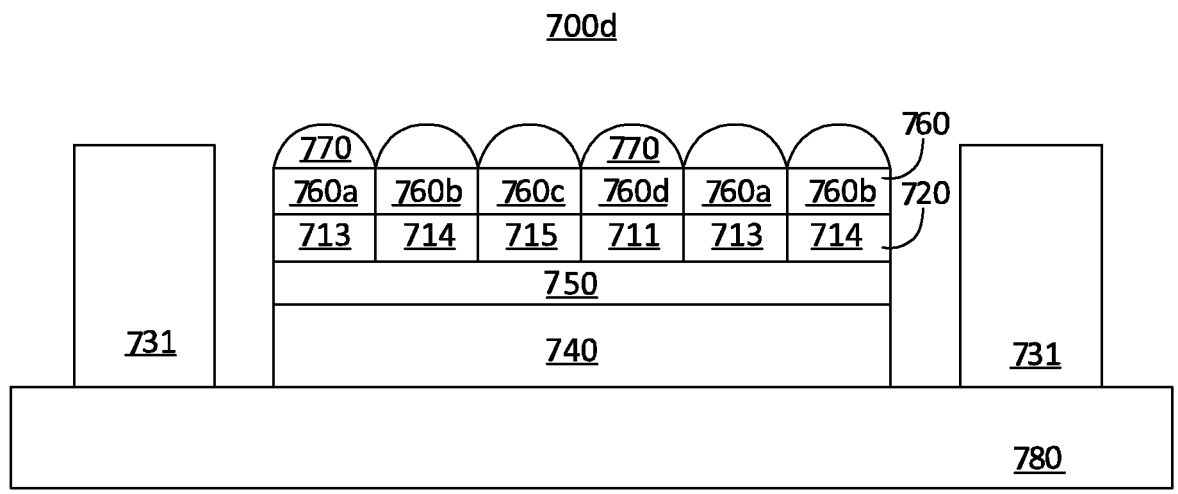
FIG. 7D illustrates a cross-sectional view of exemplary embodiments of a pixelated wideband sensor along an A-A' in FIG. 7A.

FIG. 7D illustrates a cross-sectional view of exemplary embodiments of a pixelated wideband sensor along an A-A' axis as depicted in FIG. 7A. Referring to FIG. 7A and FIG. 7D, the pixelated wideband sensor 700a further includes a light source array 730 including multiple light sources 731 surrounding the pixel array 720. The number of the light sources 731 may not be limited to the number shown in FIG. 7A. The multiple light sources 731 include light-emitting diodes or vertical-cavity surface-emitting lasers. In some embodiments, the pixelated wideband sensor 700d is configured for a shorter-range application such as contactless or 3D fingerprint sensor or under display fingerprint sensor. By multiple light sources 731 surrounding the pixel array 720, a target object can be illuminated by more light emitted from the multiple light sources 731 and thus more optical signal reflected from the target object can be received by the pixel array 720. In addition, providing multiple light sources 731 around the pixel array 720 can advantageously help provide more homogenous distribution of light across the pixel array 720. Better light distribution can help avoid a situation where some pixels 721 don't receive as much reflected light as others within the pixel array 720.

In some embodiments, each of the light sources 731 may also include an optical element (e.g., a passive optical element such as a mirror or a grating, or an active optical element such as a micro-electromechanical system (MEMS) mirror) for changing the direction of the light emitted from the multiple light sources 731 so as to modify the illumination area of the light source array 730. In some embodiments, the pixelated wideband sensor may be assembled with other modules for mid-range applications (e.g., facial recognition) or long-range applications (e.g., object sensing in self-driving applications).

Referring to FIG. 7D, in some embodiments, the pixelated wideband sensor 700d further comprises an integrated circuit layer 740 between the pixel array 720 and the carrier 780. The integrated circuit layer 740 comprises a control circuit (e.g., first, second, third, and fourth control signal as mentioned below) configured to control the pixel array 720 and/or a driver configured to control the light sources 731. In some embodiments, the integrated circuit layer 740 is disposed only between the pixel array 720 and the carrier 780, and the pixelated wideband sensor 700d may further include electrical connection (not shown) coupled to the light sources 731 and the driver of the integrated circuit layer 740. In some other embodiments, the driver circuit for the light sources 731 may be implemented on a separate chip (not shown) or may be integrated with the light sources 731.

In some embodiments, the pixelated wideband sensor 700d further comprises a bonding layer 750 between the integrated circuit layer 740 and the pixel array 720. The bonding layer 750, for example, may include interconnects for electrical connection between the integrated circuit layer 740 and the pixel array 720, and dielectric material for electrical isolation between the interconnects. The driver and/or the control circuit can be, for example, a complementary metal-oxide semiconductor (CMOS) device.

In some embodiments, the pixelated wideband sensor 700d further comprises optical filters 760 configured to pass light having a specific wavelength range corresponding to the photodetectors disposed below. The optical filters 760 may be implemented as a bandpass filter using an absorption material, or multi-layer coating, or in-plane periodic/aperiodic grating, etc. As an example, the bandpass filters 760a, 760b, 760c, and 760d may be configured to pass light having a wavelength of blue, green, red, and SWIR, respectively.

In some embodiments, the pixelated wideband sensor 700d further comprises multiple lens elements 770 for focusing, collimating, or expanding incoming optical signal into respective photodetectors below.

Figure 7E:
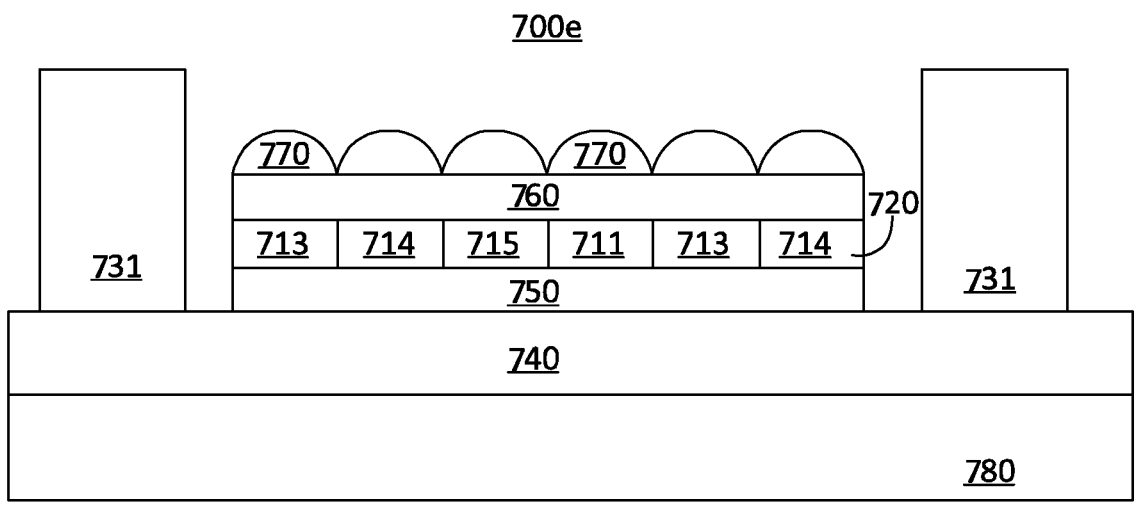
FIG. 7E a cross-sectional view of exemplary embodiments of a pixelated wideband sensor along an A-A' in FIG. 7A.

FIG. 7E a cross-sectional view of exemplary embodiments of a pixelated wideband sensor along an A-A' axis as depicted in FIG. 7A. In some embodiments, the integrated circuit layer 740 is between the light sources 731 and the carrier 780.

Figure 8:
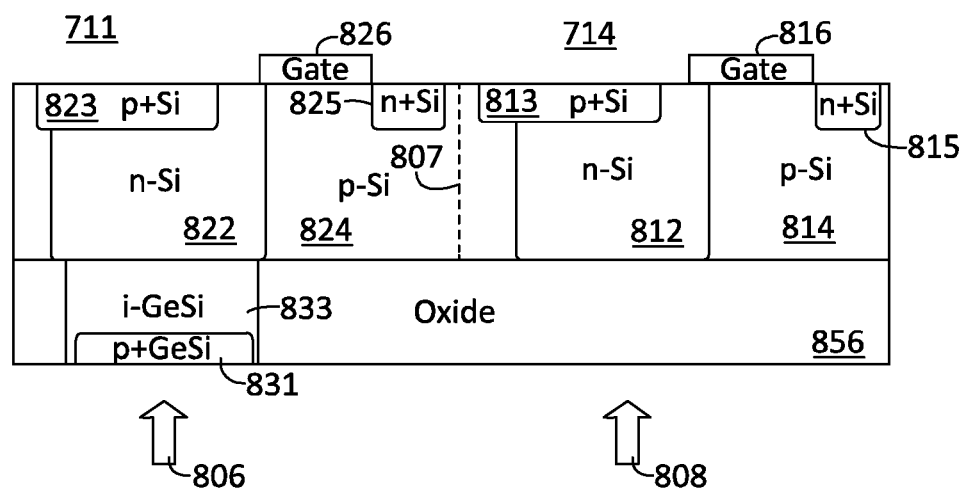
FIG. 8 illustrates exemplary embodiments of a pixel where the first photodetector unit and the second photodetector unit are associated with the same substrate.

In some embodiments, the first photodetector unit 710 and/or the second photodetector unit 712 are at least partially embedded in a substrate (e.g., silicon substrate), where the first photodetector 711 comprises a first absorption region 833 comprising germanium, and the second photodetector unit 712 comprises RGB photodetectors (e.g., 713, 714, 715 in FIG. 7B) comprising silicon. For example, FIG. 8 illustrates exemplary embodiments of a pixel where the first photodetector unit 710 and the second photodetector unit 712 are associated with a common substrate, for example, where the first photodetector unit 710 and the second photodetector unit 712 are at least partially embedded in a substrate (e.g., Si substrate 814, 824). The pixel 721 includes a first photodetector 711 and a visible photodetector, such as green photodetector 714 that are formed on a common substrate. The first photodetector 711 and the green photodetector 714 may be separated by an isolation structure 807 such as an oxide trench.

The green photodetector 714 includes an n-Si region 812, a p+ Si region 813, a p-Si region 814, an n+ Si region 815, a first gate 816. The first gate 816 is coupled to and controlled by a first control signal. The n+ Si region 815 is coupled to a first readout circuit.

The n-Si region 812 may be lightly doped with an n-dopant, e.g., about $10^{16}$ cm$^{-3}$ with phosphorus. The p+ Si region 813 may have a p+ doping, where the activated dopant concentration is as high as a fabrication process may achieve, e.g., about $5\times10^{20}$ cm$^{-3}$ with boron. The p-Si region 814 may be lightly doped with a p-dopant, e.g., about $10^{15}$ cm$^{-3}$ with boron. The n+ Si region 815 may have an n+ doping, where the activated dopant concentration is as high as a fabrication process may achieve, e.g., about $5\times10^{20}$ cm$^{-3}$ with phosphorous.

In general, the n-Si layer 812 receives an optical signal 808 and converts the optical signal 808 into electrical signals. The optical signal 808 (e.g., green light) enters the n-Si region 812, where the n-Si region 812 absorbs the optical signal 808 and converts the absorbed light into free carriers. In some implementations, the optical signal 808 may be filtered by optical filters (e.g., 760 in FIG. 7D). In some implementations, a beam profile of the optical signal 808 may be shaped by a lens element (e.g., 770 in FIG. 7D).

In general, a difference between the Fermi level of the p+ Si region 813 and the Fermi level of the n-Si region 812 creates an electric field between the two regions, where free electrons generated by the n-Si region 812 are drifted to a region below the p+ Si region 813 by the electric field. The first gate 816 may be coupled to a voltage source, for example, the first control signal may be a DC voltage signal from the voltage source. The first control signal controls a flow of free electrons from the region below the p+ Si region 813 to the n+ Si region 815. For example, if a voltage of the first control signal exceeds a threshold voltage, free electrons accumulated in the region below the p+ Si region 813 will drift to the n+ Si region 815.

The n+ Si region 815 may be coupled to the first readout circuit. The first readout circuit may be in a three-transistor configuration consisting of a reset gate, a source-follower, and a selection gate, or any suitable circuitry for processing free carriers. In some implementations, the first readout circuit may be fabricated on a substrate that is common to the green photodetector 714. For example, the first readout circuit may be included in an integrated circuit layer 740 as described in reference to FIG. 7D. In some other implementations, the first readout circuit may be fabricated on another substrate and co-packaged with the green photodetector 714 via die/wafer bonding or stacking.

The first photodetector 711 includes an n-Si region 822, a p+ Si region 823, a p-Si region 824, an n+ Si region 825, a second gate 826, a p+ GeSi region 831, and an intrinsic GeSi region 833. The second gate 826 is coupled to and controlled by a second control signal. The n+Si region 825 is coupled to a second readout circuit. The n-Si region 822 may be lightly doped with an n-dopant, e.g., about $10^{16}$ cm$^{-3}$ with phosphorus. The p+ Si region 823 may have a p+ doping, where the activated dopant concentration is as high as a fabrication process may achieve, e.g., about $5\times10^{20}$ cm$^{-3}$ with boron. The p-Si region 824 may be lightly doped with a p-dopant, e.g., about $10^{15}$ cm$^{-3}$ with boron. The n+ Si region 825 may have an n+ doping, where the activated dopant concentration is as high as a fabrication process may achieve, e.g., about $5\times10^{20}$ cm$^{-3}$ with phosphorous.

In general, the intrinsic GeSi region 833 receives an optical signal 806 and converts the optical signal 806 (e.g., SWIR light) into electrical signals. In some implementations, the optical signal 806 may be filtered by a wavelength filter not shown in this figure, such as an NIR filter in the optical filters (e.g., 760 in FIG. 7D). In some implementations, a beam profile of the optical signal 806 may be shaped by a lens element (e.g., 770 in FIG. 7D).

In some implementations, a thickness of the intrinsic GeSi region 833 may be between 0.05 μm to 2 μm. In some implementations, the intrinsic GeSi region 833 may include a p+ GeSi region 831. The p+ GeSi region 831 may repel the photo-electrons away from the intrinsic GeSi region 833 to avoid surface recombination and thereby may increase the carrier collection efficiency. For example, the p+ GeSi region 831 may have a p+ doping, where the dopant concentration is as high as a fabrication process may achieve, e.g., about $5 \times 10^{20}$ cm$^{-3}$ when the intrinsic GeSi region 833 is germanium and doped with boron.

The generated free carriers in the intrinsic GeSi region 833 may drift or diffuse into the n-Si region 822. In general, a difference between the Fermi level of the p+ Si region 823 and the Fermi level of the n-Si region 822 creates an electric field between the two regions, where free electrons collected from the intrinsic GeSi region 833 by the n-Si region 822 are drifted to a region below the p+ Si region 823 by the electric field. The second control signal may be a DC voltage signal from the voltage source. The second control signal 827 controls a flow of free electrons from the region below the p+ Si region 823 to the n+ Si region 825. For example, if a voltage of the second control signal 827 exceeds a threshold voltage, free electrons accumulated in the region below the p+ Si region 823 will drift to the n+ Si region 825. The n+ Si region 825 may be coupled to the second readout circuit. The second readout circuit may be similar to the first readout circuit.

Although not shown in FIG. 7C, in some other implementations, the green photodetector 714 and the first photodetector 711 may alternatively be fabricated to collect holes instead of electrons. In this case, the conductivity type may be opposite. For example, the p+ Si regions 813 and 823 would be replaced by n+ Si regions, the n-Si regions 812 and 813 would be replaced by p-Si regions, the p-Si regions 814 and 824 would be replaced by n-Si regions, and the n+ Si region 815 and 825 would be replaced by p+ Si regions. Note that the drawings shown here are for illustration and working principle explanation purpose.

In some embodiments, the surface of the green photodetector 714 and the first photodetector 711 that receive optical signals 806 and 808 is a planarized surface, where the intrinsic GeSi region 833 and the p+ GeSi region 831 are embedded in an oxide layer 856. For example, the oxide layer 856 may be formed on the p-Si region 814. A thickness of the oxide layer 856 may be selected to be the thickness of the intrinsic GeSi region 833. A sensor region may be formed in the oxide layer 856 by etching or any other suitable techniques. Germanium-silicon may be selectively grown in the sensor region to form the intrinsic GeSi region 833. A planarized surface between the green photodetector 714 and the first photodetector 711 enables additional processing on the photodiode surface and/or bonding with devices fabricated on a separate substrate.

Although not shown in FIG. 8, the pixel 721 also includes a blue photodetector 713 and a red photodetector 715 as shown in FIG. 7B. The blue photodetector 713 and the red photodetector 715 may include structures similar to the green photodetector 714. In some embodiments, the blue photodetector 713 is controlled by a third control signal and coupled to a third readout circuit to process the collected carriers. In some embodiments, the red photodetector 715 is controlled by a fourth control signal and coupled to a fourth readout circuit to process the collected carriers. Each of the red photodetector 715 and the blue photodetector 713 include a respective wavelength filter region (e.g., bandpass filters 760a, 760b, 760c, and 760d) in optical filters (e.g., 760 in FIG. 7D) configured to transmit a portion of received light and a respective lens element (e.g., 770 in FIG. 7D) configured to focus the received light.

Some other example pixels associated with the same substrate are disclosed in U.S. patent application Ser. No. 15/228,282, titled "Germanium-Silicon Light Sensing Apparatus" and filed on Aug. 4, 2016, which is fully incorporated by reference herein.

Figure 9:
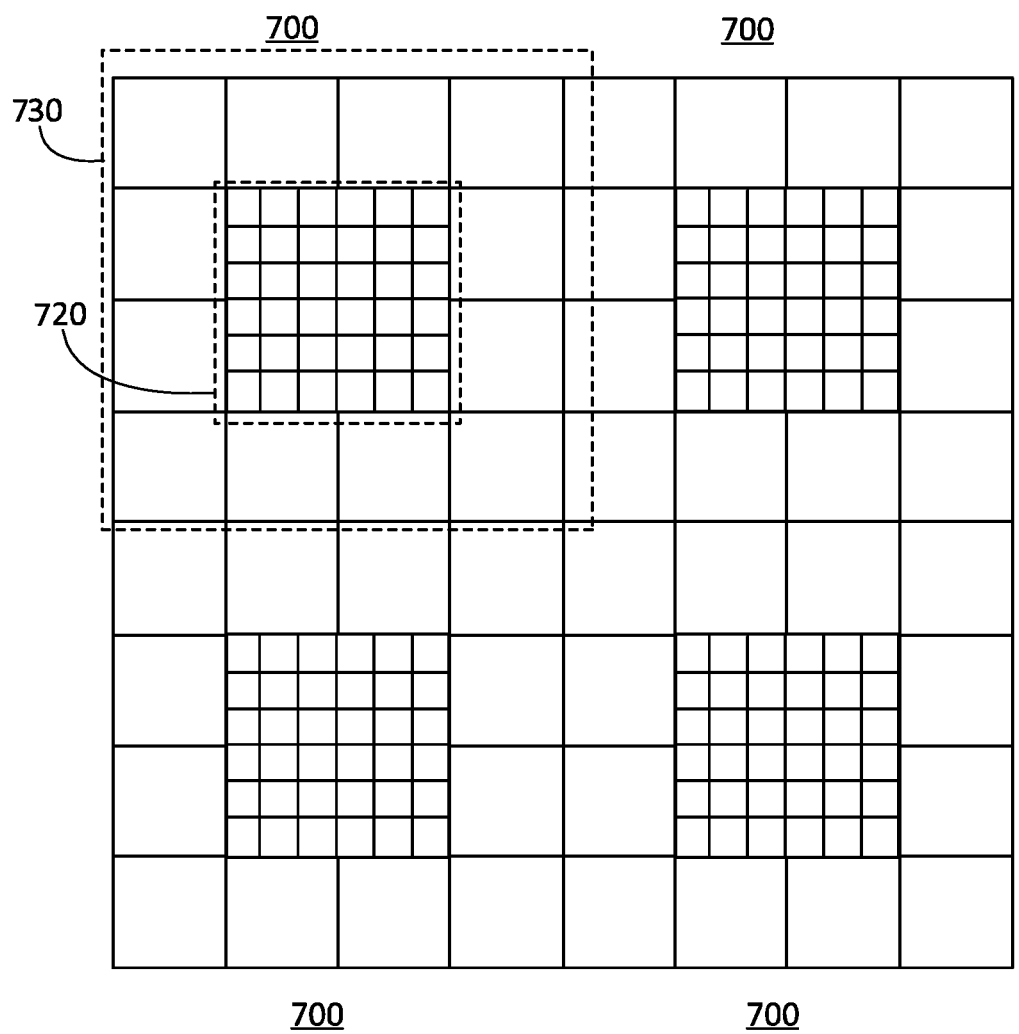
FIG. 9 illustrates exemplary embodiments of a pixelated wideband sensor assembly.

FIG. 9 illustrates exemplary embodiments of a pixelated wideband sensor assembly. The pixelated wideband sensor assembly 900 includes multiple pixelated wideband sensors 700 arranged in a two-dimensional or one-dimensional array. The pixelated wideband sensors 700 may be any embodiments as described above. Since the pixelated wideband sensor assembly includes multiple pixelated wideband sensors 700, the pixelated wideband sensor assembly can be easily assembled into any desired dimensions. Moreover, the total illumination area of can be larger and the light incident on the target object can be more evenly distributed. Furthermore, the optical signal reflected from the target object can be more easily captured by one of the pixel arrays 720 since there are multiple pixel arrays 720 distributed in the space.

Figure 10A:
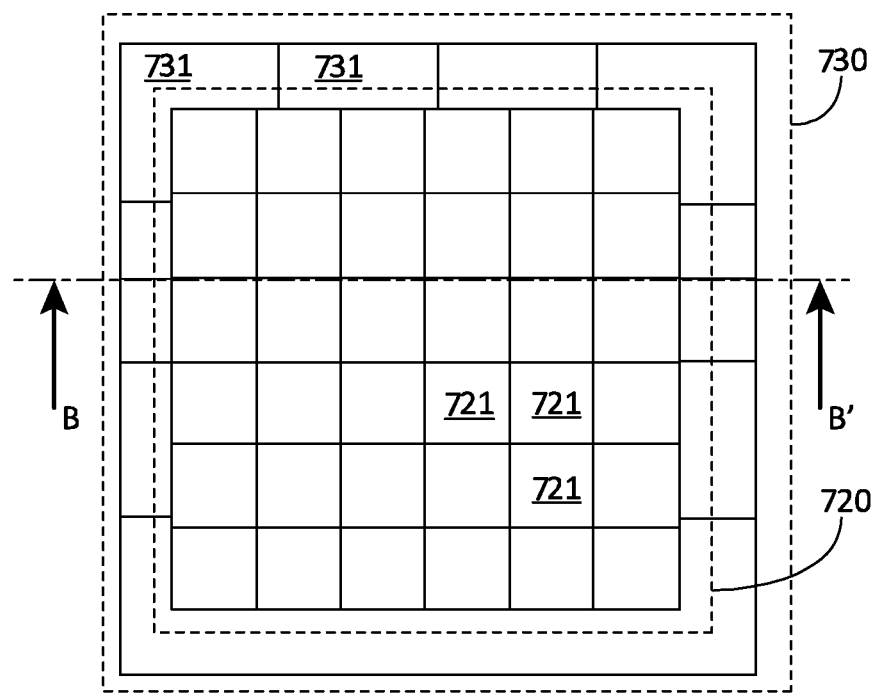
FIG. 10A illustrates a top view of exemplary embodiments of a pixelated wideband sensor.
Figure 10B:
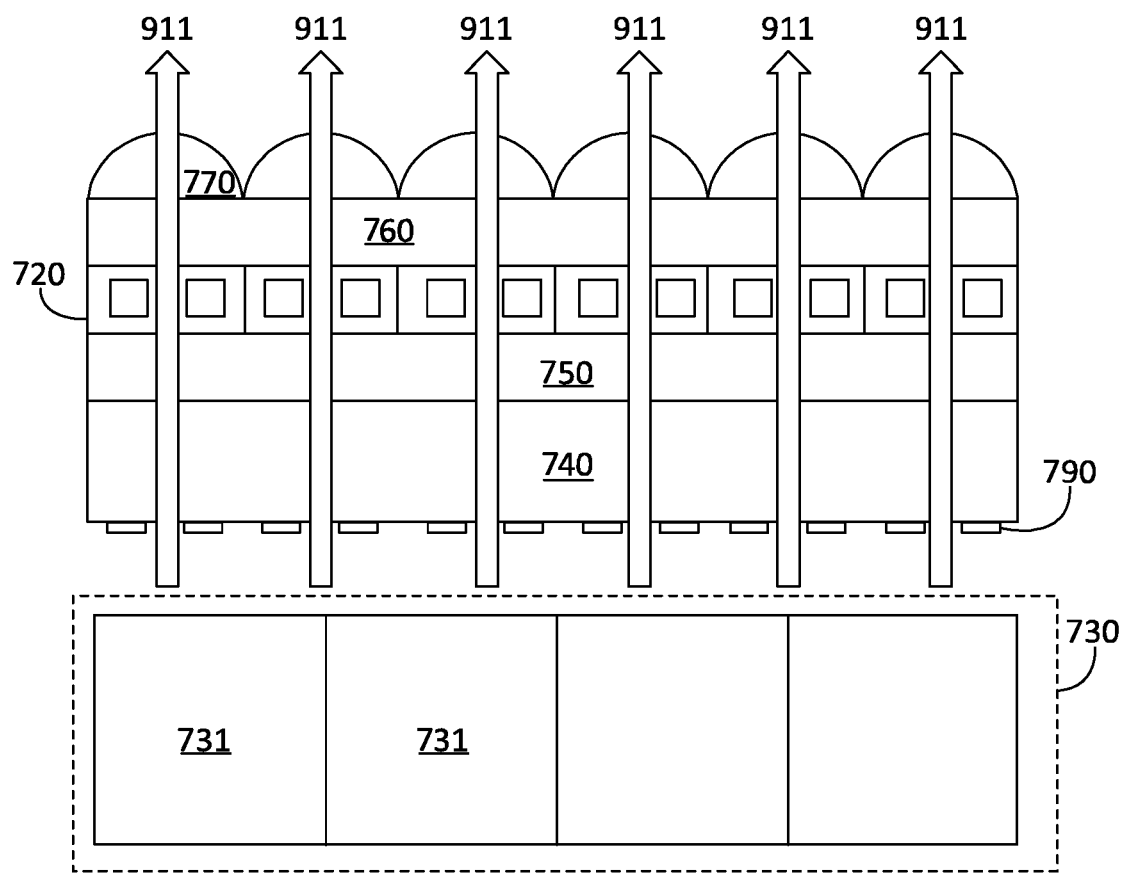
FIG. 10B illustrates exemplary embodiments of a pixelated wideband sensor along a B-B' in FIG. 10A.

FIG. 10A illustrates a top view of exemplary embodiments of a pixelated wideband sensor. FIG. 10B illustrates exemplary embodiments of a pixelated wideband sensor along a B-B' axis as depicted in FIG. 10A.

The pixelated wideband sensor 940a is substantially the same as the pixelated wideband sensor 700a as described before, the differences being described below. The light source array 730 comprising multiple light sources 731 is disposed under the pixel array 720. The pixelated wideband sensor 940a further includes a shielding layer 790 between the light source array 730 and the pixel array 720. The shielding layer 790 is configured to block the light emitted from the light sources 731 from directly absorbed by the absorption regions of the pixel array 720. As a result, the light 911 emitted from the light sources 731 can pass through the light source array 730 and be incident on a target object.

In some embodiments, shielding layer 790 is composed in part of a filtering material, e.g., a polymer or other material absorbing the light.

In some embodiments, the light emitted from the light sources 731 is with a peak wavelength in an invisible range, such as greater than 800 nm or between about 1400 nm and 3000 nm so as to avoid being absorbed by the substrate (e.g., silicon substrate) in the pixel. In some embodiments, the second photodetector unit 712 in the pixel is ambient light sensor.

In some embodiments, the light source in the present disclosure may include one or more light emitting diodes (LEDs) or vertical-cavity surface-emitting lasers (VCSELs) emitting an optical signal.

Various means can be configured to perform the methods, operations, and processes described herein. For example, any of the systems and apparatuses (e.g., optical sensing apparatus and related circuitry) can include unit(s) and/or other means for performing their operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry. For example, the means can include or otherwise be able to access memory such as, for example, one or more non-transitory computer-readable storage media, such as random-access memory, read-only memory, electrically erasable programmable read-only memory, erasable programmable read-only memory, flash/ other memory device(s), data register(s), database(s), and/or other suitable hardware.

As used herein, the terms such as "first", "second", "third", "fourth" and "fifth" describe various elements, components, regions, layers and/or sections, these elements, components, regions, layers and/or sections should not be limited by these terms. These terms may be only used to distinguish one element, component, region, layer or section from another. The terms such as "first", "second", "third", "fourth" and "fifth" when used herein do not imply a sequence or order unless clearly indicated by the context. The terms "photo-detecting", "photo-sensing", "light-detecting", "light-sensing" and any other similar terms can be used interchangeably.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for operating an optical detector module, comprising:
   (i) detecting, by a receiver unit of the optical detector module, an ambient light;
   (ii) acquiring, by a processor of the optical detector module, a first integral value from the receiver unit corresponding to the ambient light;
   (iii) determining, by the processor, whether the first integral value satisfies a first threshold condition;
   (iv) in response to determining that the first integral value does not satisfy the first threshold condition, sending, by a controller of the optical detector module, one or more first control signals to (1) disable a first light source of a transmitter unit of the optical detector module configured to emit a first optical signal with a first peak wavelength and disable a second light source of the transmitter unit of the optical detector module configured to emit a second optical signal with a second peak wavelength, or (2) lower a detecting frequency of the receiver unit; and
   (v) in response to determining that the first integral value satisfies the first threshold condition, sending, by the controller, one or more second control signals to enable the first light source of the transmitter unit of the optical detector module to emit the first optical signal with the first peak wavelength.

2. The method of claim 1, wherein (v) further comprises:
   (a) acquiring, by the processor, a second integral value from the receiver unit corresponding to the first optical signal;
   (b) determining, by the processor, whether the second integral value satisfies a second threshold condition;
   (c) in response to determining that the second integral value satisfies the second threshold condition, sending, by the controller, one or more third control signals to enable the second light source of the transmitter unit of the optical detector module to emit the second optical signal with the second peak wavelength, wherein the first peak wavelength is different from the second peak wavelength; and
   (d) in response to determining that the second integral value does not satisfy the second threshold condition, sending, by the controller, one or more fourth control signals to (1) disable the second light source or (2) lower the detecting frequency of the receiver unit.

3. The method of claim 1, wherein lowering the detecting frequency of the receiver unit further comprises (1) lowering a frequency of the first optical signal emitted by the first light source or lowering a frequency of the second optical signal emitted by the second light source; or (2) lowering an operating frequency of the receiver unit.

4. The method of claim 2, wherein (a) further comprises:
   obtaining, by the processor and from the receiver unit, a first background integral value corresponding to ambient light within a first reference time slot before a first target time slot;
   obtaining, by the processor and from the receiver unit, a first foreground integral value corresponding to a combination of the ambient light and the first optical signal within the first target time slot;
   obtaining, by the processor and from the receiver unit, a second background integral value corresponding to ambient light within a second reference time slot after the first target time slot;
   determining, by the processor, an average of the first background integral value and the second background integral value to obtain an averaged background integral value; and
   adjusting, by the processor and based on the averaged background integral value, the first foreground integral value to determine the second integral value.

5. The method of claim 2, wherein (a) further comprises:
   obtaining, by the processor and from the receiver unit, a first group of background integral values corresponding to ambient light within multiple first reference time slots before a first target time slot;

obtaining, by the processor and from the receiver unit, a first foreground integral value corresponding to a combination of ambient light and the first optical signal within the first target time slot;

obtaining, by the processor and from the receiver unit, a second group of background integral values corresponding to ambient light within multiple second reference time slots after the first target time slot;

determining, by the processor, an average of the first group of background integral values and the second group of background integral values to obtain an averaged background integral value; and adjusting, by the processor and based on the averaged background integral value, the first foreground integral value to determine the second integral value.

6. The method of claim 2, wherein (c) further comprises:
detecting, by the receiver unit of the optical detector module, the second optical signal with the second peak wavelength;
acquiring, by the processor, a third integral value corresponding to the second optical signal;
determining, by the processor, a comparison of the second integral value and the third integral value; and
identifying, by the processor and based on the comparison, a material of a target.

7. The method of claim 6, wherein acquiring the third integral value further comprises:
obtaining, by the processor and from the receiver unit, a third background integral value corresponding to the ambient light within a third reference time slot before a second target time slot;
obtaining, by the processor and from the receiver unit, a second foreground integral value corresponding to a combination of ambient light and the second optical signal within the second target time slot;
obtaining, by the processor and from the receiver unit, a fourth background integral value corresponding to ambient light within a fourth reference time slot after the second target time slot;
determining, by the processor, an average of the third background integral value and the fourth background integral value to obtain an averaged background integral value; and
adjusting, by the processor and based on the averaged background integral value, the second foreground integral value to determine the third integral value.

8. The method of claim 7, wherein acquiring the second integral value further comprises:
obtaining, by the processor and from the receiver unit, a first background integral value corresponding to ambient light within a first reference time slot before a first target time slot;
obtaining, by the processor and from the receiver unit, a first foreground integral value corresponding to a combination of ambient light and the first optical signal within the first target time slot;
obtaining, by the processor and from the receiver unit, a second background integral value corresponding to ambient light within a second reference time slot after the first target time slot;
determining, by the processor, an average of the first background integral value and the second background integral value to obtain an averaged background integral value; and
adjusting, by the processor and based on the averaged background integral value, the first foreground integral value to determine the second integral value.

9. The method of claim 6, wherein acquiring the third integral value further comprises:
obtaining, by the processor and from the receiver unit, a third group of background integral values corresponding to ambient light within multiple third reference time slots before a second target time slot;
obtaining, by the processor and from the receiver unit, a second foreground integral value corresponding to a combination of ambient light and the second optical signal within the second target time slot;
obtaining, by the processor and from the receiver unit, a fourth group of background integral values corresponding to ambient light within multiple fourth reference time slots after the second target time slot;
determining, by the processor, an average of the third group of background integral values and the fourth group of background integral values to obtain an averaged background integral value; and
adjusting, by the processor and based on the averaged background integral value, the second foreground integral value to determine the second integral value.

10. The method of claim 9, wherein acquiring the second integral value further comprises:
obtaining, by the processor and from the receiver unit, a first group of background integral values corresponding to ambient light within multiple first reference time slots before a first target time slot;
obtaining, by the processor and from the receiver unit, a first foreground integral value corresponding to a combination of ambient light and the first optical signal within the first target time slot;
obtaining, by the processor and from the receiver unit, a second group of background integral values corresponding to ambient light within multiple second reference time slots after the first target time slot;
determining, by the processor, an average of the first group of background integral values and the second group of background integral values to obtain an averaged background integral value; and
adjusting, by the processor and based on the averaged background integral value, the first foreground integral value to determine the second integral value.

11. The method of claim 6, wherein the material comprises human skin, wood or fabric.

12. The method of claim 6, further comprising:
determining, by the processor, whether the material of the target is skin; and
in response to determining that the material of the target is not skin, repeating steps (i), (ii), (iii), (iv) and (v).

13. The method of claim 6, further comprising:
determining, by the processor, whether the material of the target is skin; and
in response to determining that the material of the target is skin, implementing a health sensing function comprising at least one of determining a heartrate, determining a temperature, or determining an oxygen saturation level.

14. The method of claim 6, further comprising:
determining, by the processor, whether the material of the target is skin; and
in response to determining that the material of the target is skin, implementing a biometric authentication operation.

15. The method of claim 6, further comprising:
determining, by the processor, whether the material of the target is skin; and in response to determining that the material of the target is skin, adjusting one or more operating parameters of the optical detector module to reduce power expended by the optical detector module.

16. An optical detector module, comprising:
a receiver unit;
a transmitter unit, comprising a first light source configured to emit first optical signal with first peak wavelength and a second light source configured to emit second light with second peak wavelength;
a processor in electrical communication with the receiver unit;
a controller in electrical communication with the receiver unit, the processor and/or the transmitter unit; wherein the optical detector module is configured to perform operations comprising:
 detecting, by the receiver unit of the optical detector module, an ambient light;
 acquiring, by the processor, a first integral value from the receiver unit corresponding to the ambient light;
 determining, by the processor, whether the first integral value satisfies a first threshold condition;
 in response to determining that the first integral value does not satisfy the first threshold condition, sending, by a controller, one or more first control signals to (1) disable a first light source of the transmitter unit of the optical detector module and disable a second light source of the transmitter unit of the optical detector module, or (2) lower a detecting frequency of the receiver unit; and
 in response to determining that the first integral value satisfies the first threshold condition, sending, by the controller, one or more second control signals to enable the first light source of the transmitter unit of the optical detector module to emit the first optical signal with the first peak wavelength.

17. The optical detector module of claim 16, wherein the optical detector module is configured for use in a wireless earbud.

18. The optical detector module of claim 16, wherein the optical detector module is configured for use in a wearable computing device.

19. A method for operating an optical detector module comprising multiple receiver units and multiple transmitter units corresponding to the multiple receiver units respectively, wherein each of the multiple transmitter units includes a light source, and the method comprises:
 (i) detecting, by at least one of the receiver units of the optical detector module, an ambient light;
 (ii) acquiring, by a processor, a first integral value from the receiver unit corresponding to the ambient light;
 (iii) determining, by the processor, whether the first integral value satisfies a first threshold condition;
 (iv) in response to determining that the first integral value does not satisfy the first threshold condition, sending, by a controller, one or more first control signals to (1) disable at least one of the one or more light source of the multiple transmitter units or (2) lower a detecting frequency of each of the receiver units; and
 (v) in response to determining that the first integral value satisfies the first threshold condition, sending, by the controller, one or more second control signals to enable one or more of the light sources of the multiple transmitter units of the optical detector module to emit the first optical signal with the first peak wavelength.

20. The method of claim 19, wherein (v) further comprises:
 acquiring, by the processor, a second integral value from one of the receiver units corresponding to the first optical signal and the ambient light;
 determining, by the processor, whether the second integral value satisfies a second threshold condition;
 in response to determining that the second integral value satisfies the second threshold condition, sending, by the controller, one or more fourth control signals to (1) enable another one or more of the light sources of the multiple transmitter units; and
 in response to determining that the second integral value does not satisfy the second threshold condition, sending, by the controller, one or more third control signals to disable at least one of the light sources or (2) lower the detecting frequency of the receiver unit corresponding to the at least one of the light sources.

* * * * *